(12) United States Patent
Kitade et al.

(10) Patent No.: US 11,342,702 B2
(45) Date of Patent: May 24, 2022

(54) ELECTRICAL CONNECTION STRUCTURE

(71) Applicant: AGC Inc., Tokyo (JP)

(72) Inventors: Sotaro Kitade, Tokyo (JP); Takashi Sato, Tokyo (JP); Hidehiko Watanabe, Tokyo (JP)

(73) Assignee: AGC INC., Tokyo (JP)

( * ) Notice: Subject to any disclaimer, the term of this patent is extended or adjusted under 35 U.S.C. 154(b) by 6 days.

(21) Appl. No.: 16/931,593

(22) Filed: Jul. 17, 2020

(65) Prior Publication Data

US 2021/0028571 A1 Jan. 28, 2021

(30) Foreign Application Priority Data

Jul. 24, 2019 (JP) .............................. JP2019-135955
Jun. 3, 2020 (JP) .............................. JP2020-096572

(51) Int. Cl.
| | | |
|---|---|---|
| *H01R 33/945* | (2006.01) | |
| *H01R 13/24* | (2006.01) | |
| *B60R 16/03* | (2006.01) | |
| *B60J 1/00* | (2006.01) | |

(52) U.S. Cl.
CPC ......... *H01R 13/2457* (2013.01); *B60R 16/03* (2013.01); *B60J 1/002* (2013.01); *H01R 2201/02* (2013.01); *H01R 2201/26* (2013.01)

(58) Field of Classification Search
CPC ............ H01R 13/2457; H01R 2201/02; H01R 2201/26; B60R 16/03; B60J 1/002
USPC ....................................................... 439/577
See application file for complete search history.

(56) References Cited

U.S. PATENT DOCUMENTS

| | | | | |
|---|---|---|---|---|
| 1,965,170 A | * | 7/1934 | Benjamin ............... | F21V 17/00 362/219 |
| 4,658,331 A | * | 4/1987 | Berg ..................... | H05K 7/1061 361/705 |
| 4,774,550 A | * | 9/1988 | Igarashi ............... | H04N 1/0083 313/493 |
| 5,001,297 A | * | 3/1991 | Peregrim ............. | H05K 9/0016 174/354 |
| 5,549,198 A | * | 8/1996 | Thiele .................. | G11B 23/027 206/307 |
| 5,645,585 A | * | 7/1997 | Kuzma ................ | A61N 1/0541 607/137 |

(Continued)

FOREIGN PATENT DOCUMENTS

| | | |
|---|---|---|
| WO | WO-03/076239 A1 | 9/2003 |
| WO | WO-2014/024980 A1 | 2/2014 |
| WO | WO-2017/078162 A1 | 5/2017 |

*Primary Examiner* — Abdullah A Riyami
*Assistant Examiner* — Vladimir Imas
(74) *Attorney, Agent, or Firm* — Foley & Lardner LLP

(57) ABSTRACT

An electrical connection structure according to the present disclosure includes a glass plate, a power supply part formed on the glass plate, a connection terminal including a base part facing the glass plate, and a spring member disposed between the power supply part and the base part and configured to electrically connect the power supply part to the base part. The spring member includes a fixing part, a curved part, and contact parts. The curved part includes branch parts branched by a slit. The contact part is disposed at each of end parts of the branch parts. The contact parts are in contact with the base part independently of each other. The curved part is in contact with the power supply part at a part protruding toward the glass plate.

20 Claims, 17 Drawing Sheets

(56) References Cited

U.S. PATENT DOCUMENTS

| | | | | |
|---|---|---|---|---|
| 5,727,955 A * | 3/1998 | Tsubakihara | ............ | H01L 23/32 439/67 |
| 6,103,998 A * | 8/2000 | Kuno | ................ | B29C 45/14344 219/203 |
| 6,544,047 B2 * | 4/2003 | Moore | .................... | H01R 4/64 174/376 |
| 7,059,884 B2 * | 6/2006 | Hisaeda | ................. | H01R 13/20 439/329 |
| 7,514,654 B2 * | 4/2009 | Okajima | .............. | B23K 1/0008 219/522 |
| 7,554,815 B2 * | 6/2009 | Hardt | ................... | H05K 7/1487 361/742 |
| 7,602,452 B2 * | 10/2009 | Kato | ................ | G02F 1/136286 349/38 |
| 7,619,256 B2 * | 11/2009 | Hirabayashi | ...... | G02F 1/136213 257/59 |
| 8,466,540 B2 * | 6/2013 | Tanaka | .................... | B81C 1/0023 257/676 |
| 8,605,456 B2 * | 12/2013 | Brad | ....................... | G06F 1/185 361/787 |
| 8,926,338 B2 * | 1/2015 | Kiryu | .................... | H01R 13/24 439/66 |
| 9,520,665 B2 * | 12/2016 | Takeuchi | ............. | H01R 43/007 |
| 9,960,510 B2 * | 5/2018 | Shiraishi | ............ | H01R 12/7082 |
| 10,326,221 B2 * | 6/2019 | Terashima | ............ | H01R 13/04 |
| 10,374,330 B1 * | 8/2019 | Bennett | ................. | H01R 13/111 |
| 10,601,148 B2 * | 3/2020 | Bulgajewski | ........ | H05K 1/0212 |
| 2002/0166852 A1 * | 11/2002 | Kim | ........................ | H05B 3/84 219/203 |
| 2005/0112291 A1 | 5/2005 | Okajima et al. | | |
| 2009/0206219 A1 | 8/2009 | Wendt et al. | | |
| 2011/0163569 A1 * | 7/2011 | Yoneyama | ........... | H01R 12/515 296/146.1 |
| 2014/0087605 A1 | 3/2014 | Kiryu et al. | | |
| 2015/0155646 A1 | 6/2015 | Takeuchi et al. | | |
| 2015/0342553 A1 * | 12/2015 | Sato | .......................... | G01T 7/00 250/336.1 |
| 2016/0221442 A1 * | 8/2016 | Atsumi | ...................... | B60J 1/08 |
| 2018/0254570 A1 | 9/2018 | Terashima et al. | | |

\* cited by examiner

000
ELECTRICAL CONNECTION STRUCTURE

INCORPORATION BY REFERENCE

This application is based upon and claims the benefit of priority from Japanese patent application No. 2019-135955, filed on Jul. 24, 2019, and Japanese patent application No. 2020-096572, filed on Jun. 3, 2020, the disclosures of which are incorporated herein in its entirety by reference.

BACKGROUND

The present disclosure relates to an electrical connection structure.

A conductive material such as an electric heating wire for defogging and an antenna for receiving broadcast waves is formed on a glass plate for a vehicle. In order to supply power to such a conductive material, an electrical connection terminal is provided on the glass plate.

International Patent Publication No. WO 2003/076239 discloses an electrical connection structure that electrically connects a conductive material formed on a glass plate using a solder material. As a structure for fixing a connection terminal onto the glass plate, International Patent Publication No. WO 2014/024980 discloses an electrical connection structure for fixing a connection terminal onto the glass plate by using a curable resin or a double-sided tape without using a solder material. International Patent Publication No. WO 2017/078162 discloses an electrical connection structure for electrically connecting a conductive material (power supply part) to a base part using a spring member fixed to the base part.

SUMMARY

As described in the background art, the aforementioned International Patent Publications disclose an electrical connection structure for electrically connecting a connection terminal to a conductive material (power supply part) formed on a glass plate. Among the techniques disclosed in these International Patent Publications, in the electrical connection structure disclosed in International Patent Publication No. WO 2017/078162, a spring member is provided between a power supply part formed on a glass plate and a connection terminal (base part), and the power supply part is electrically connected to the connection terminal (base) by using a spring member.

However, in the electrical connection structure disclosed in International Patent Publication No. WO 2017/078162, the connection between the power supply part and the spring member on the glass plate (contact area) may vary, and the connection between the connection terminal and the spring member (contact area) may vary. If the connection with the spring member varies in this way, a contact resistance value between the power supply part and the connection terminal with the spring member interposed therebetween also varies, so that the electrical current flowing between the power supply part and the connection terminal also varies. This causes individual differences in the electrical connection structures, resulting in an unstable connection between the power supply part and the connection terminal on the glass plate.

In light of the above problem, an object of the present disclosure is to provide an electrical connection structure capable of stably connecting a power supply part on a glass plate to a connection terminal using a spring member.

An example aspect of the present disclosure is an electrical connection structure including: a glass plate; a power supply part formed on the glass plate; a connection terminal including a base part facing the glass plate; and a spring member disposed between the power supply part and the base part and configured to electrically connect the power supply part to the base part. The spring member includes: a fixing part fixed to the base part; a curved part extending in a first direction parallel to a main surface of the base part from the fixing part and curved in such a way that a central part of the curved part protrudes toward the glass plate; and a first contact part and a second contact part disposed at end parts of the curved part on the first direction side. The curved part includes a first branch part and a second branch part branched by a slit extending in the first direction. The first contact part and the second contact part are disposed at end parts of the first branch part and the second part, respectively, on the first direction side. The first contact part and the second contact part are in contact with the base part independently of each other. The curved part is in contact with the power supply part at a part protruding toward the glass plate.

In the above electrical connection structure, the slit may extend in the first direction starting from a position between an end part of the fixing part on the first direction side and the part of the curved part in contact with the power supply part. In the curved part, the first branch part may be in contact with the power supply part at a third contact part protruding toward the glass plate, and the second branch part may be in contact with the power supply part at a fourth contact part protruding toward the glass plate.

In the above electrical connection structure, a through hole may be formed in the fixing part of the spring member, and the fixing part may be fixed to the base part by inserting a projection of the base part into the through hole.

In the above electrical connection structure, the projection of the base part may be penetrated through the through hole, a leading end of the projection may be greater than an inner diameter of the through hole on a surface of the fixing part on the glass plate side, and the fixing part may be fixed to the base part.

In the above electrical connection structure, one through hole may be formed in the fixing part of the spring member, and the base part may include a weir part protruding from the base part toward the glass plate around the fixing part.

In the above electrical connection structure, the fixing part may have a polygonal shape in a plan view, and the weir part may be provided at a position facing at least one side around the fixing part.

In the above electrical connection structure, the weir parts may be provided at positions facing respective two sides parallel to the first direction from among sides of the fixing part.

In the above electrical connection structure, the fixing part may have a quadrangular shape in a plan view, and the weir parts may be provided at positions facing respective three sides of sides of the fixing part other than a side of the fixing part on the curved part side.

In the above electrical connection structure, a height of the weir part may be greater than or equal to a height of the fixing part.

In the above electrical connection structure, two or more of the through holes may be formed in the fixing part of the spring member.

In the above electrical connection structure, the base part may include a first wall part and a second wall part that protrude from the base part toward the glass plate around the first contact part and the second contact part, respectively, the first wall part may be formed to extend in the first direction on an opposite side of the slit of the first contact part, and the second wall part may be formed to extend in the first direction on an opposite side of the slit of the second contact part.

In the above electrical connection structure, an area where the base part may be in contact with the fixing part may be larger than a sum of an area where the base part is in contact with the first contact part and an area where the base part is in contact with the second contact part.

In the above electrical connection structure, each of the first contact part and the second contact part may have a substantially quadrangular shape in a plan view, and in each of the first contact part and the second contact part, a length of a side extending in a second direction substantially orthogonal to the first direction may be greater than a side extending in the first direction.

In the above electrical connection structure, the spring member may include: a first non-contact part extending further in the first direction from the first contact part and not in contact with the base part, and a second non-contact part extending further in the first direction from the second contact part and not in contact with the base part.

The above electrical connection structure may further include an adhesive member for bonding the base part to the glass plate, the adhesive member may include a first adhesive member, the first adhesive member may be disposed to surround a periphery of the spring member in a plan view, and the adhesive member may maintain a height of the spring member in a direction of the protrusion between the glass plate and the base part.

The above electrical connection structure may include a space formed by the glass plate, the base part, and the first adhesive member forms a closed space.

In the above electrical connection structure, the adhesive member may include a second adhesive member, and the second adhesive member may bond the base part to the glass plate.

In the above electrical connection structure, the base part may include a protrusion protruding from the main surface of the base part toward the glass plate, and the spring member disposed between the power supply part and the base part may be configured to be prevented from being excessively deformed by the protrusion contacting with the glass plate.

In the above electrical connection structure, a plurality of the spring members may be spaced apart from each other.

In the above electrical connection structure, all of the slits of the plurality of spring members may extend in the first direction.

In the above electrical connection structure, directions in which the slits of the at least two spring members from among the plurality of spring members extend may differ from each other.

In the above electrical connection structure, the slits of the two spring members may extend in directions opposite to each other on one straight line.

According to the electrical connection structure of the present disclosure, it is possible to stably connect a power supply part on a glass plate to a connection terminal using a spring member and to stabilize an electrical current flowing between the power supply part and the connection terminal.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, an embodiment of the present disclosure will be described with reference to the drawings.

Figure 1:
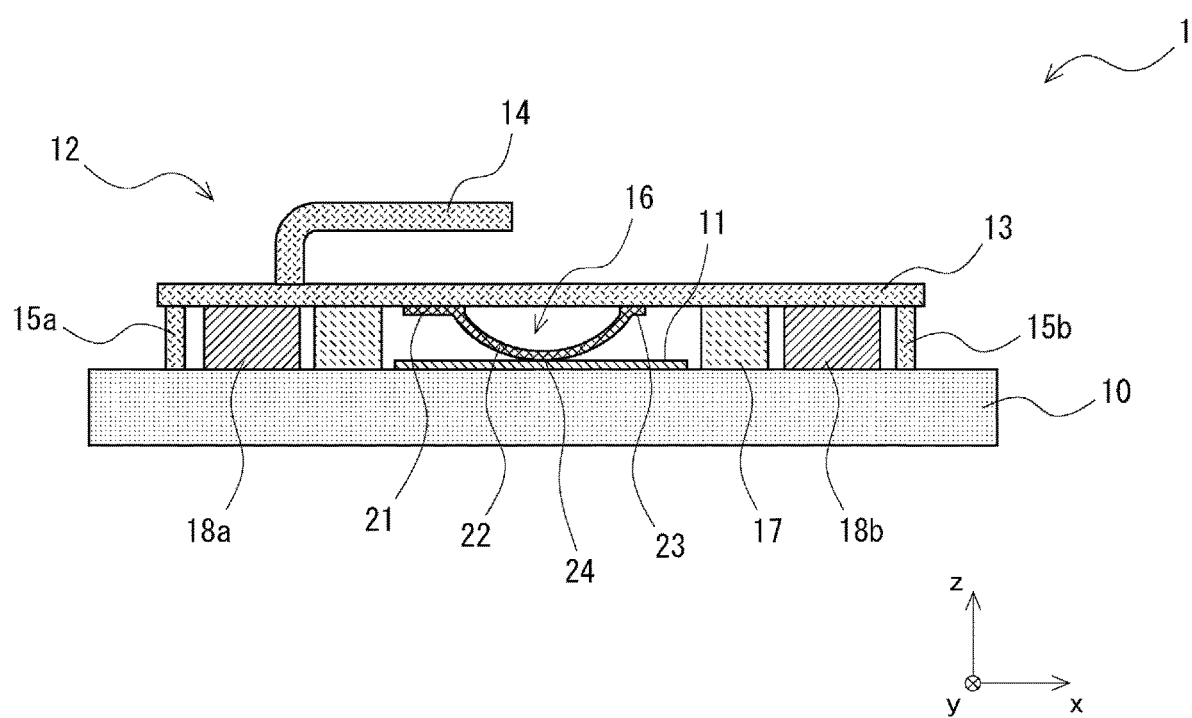
FIG. 1 is a cross-sectional view for explaining an electrical connection structure according to an embodiment of the present disclosure.
Figure 2:
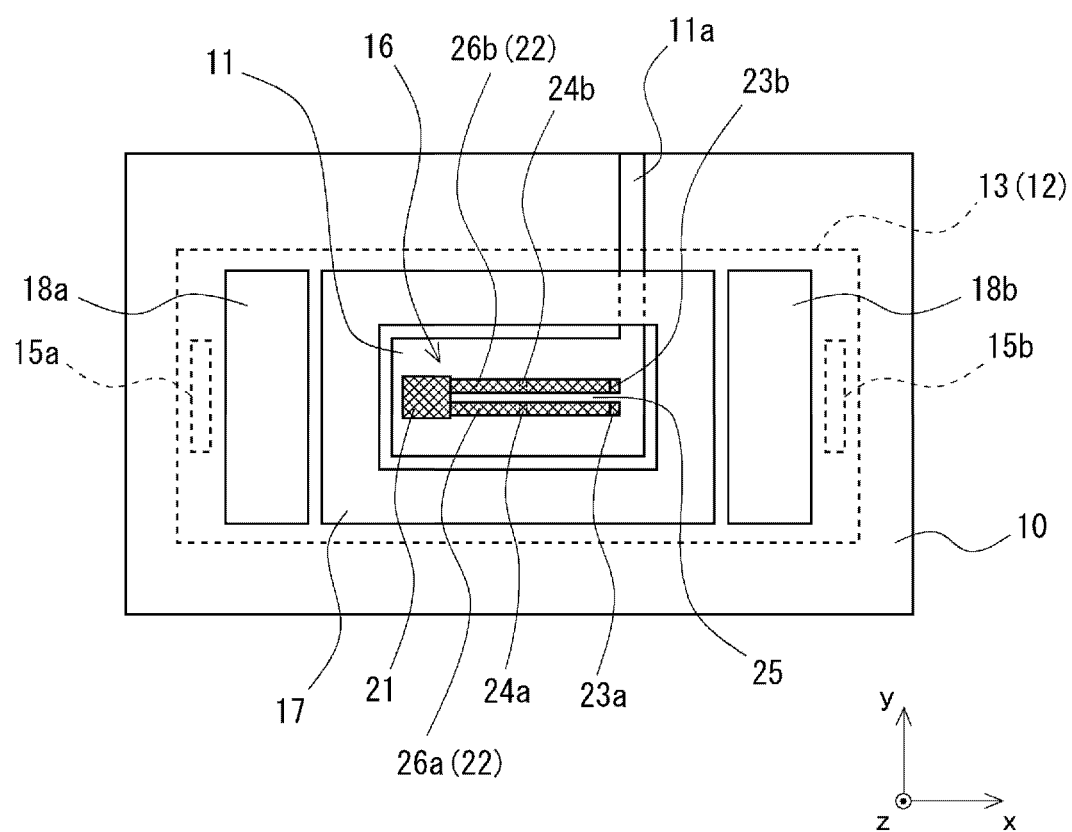
FIG. 2 is a plan view for explaining an electrical connection structure according to the embodiment of the present disclosure.

FIG. 1 is a cross-sectional view and FIG. 2 is a plan view for explaining an electrical connection structure according to the embodiment. In the electrical connection structure of FIG. 2, the positions of the base part 13 (connection terminal 12) and the protrusions 15a and 15b on the glass plate 10 are indicated by broken lines.

As shown in FIGS. 1 and 2, the electrical connection structure 1 according to this embodiment includes the glass plate 10, a power supply part 11 formed on the glass plate 10, a connection terminal 12, and a spring member 16. The electrical connection structure 1 according to this embodiment has a structure in which the power supply part 11 formed on the glass plate 10 and the connection terminal 12 (base part 13) are in contact with each other and are electrically connected to each other with the spring member 16 interposed therebetween.

The glass plate 10 is, for example, a glass plate for a vehicle. For example, the glass plate 10 is a laminated glass and has a structure in which a plurality of single-layer glasses are bonded to each other with an intermediate film interposed therebetween. The glass plate 10 may be a single-layer glass. The power supply part 11 is formed on a main surface (the surface on the positive side in the z-axis direction) of the glass plate 10. As shown in FIG. 2, the power supply part 11 is formed in a quadrangular shape when viewed from the z-axis direction (in a plan view). In the examples shown in FIGS. 1 and 2, the power supply part 11 is disposed inside an adhesive member 17 and adhesive members 18 (adhesive members 18a and 18b). For example, when the adhesive member 17 and the adhesive members 18 are disposed to overlap the power supply part 11, an adhesive force of the adhesive member 17 may be reduced at a position where they overlap. Thus, in the examples shown in FIGS. 1 and 2, the power supply part 11 is disposed so as not to overlap the adhesive member 17 and the adhesive members 18. In this specification, the adhesive member 17 is also referred to as a first adhesive member, the adhesive members 18a and 18b are collectively referred to as a second adhesive member, and the first adhesive member and the second adhesive member are collectively referred to as an "adhesive member".

Note that in this embodiment, at least the power supply part 11 may be configured to be in contact with the spring member 16, and the shape of the power supply part 11 as viewed from the main surface side of the glass plate 10 (in the XY plane) can be freely determined. Further, if a predetermined or higher level of the adhesive force of the adhesive member 17 and the adhesive members 18 can be ensured even when the adhesive member 17 and the adhesive members 18 are disposed to overlap the power supply part 11, the adhesive member 17 may be disposed to overlap the power supply part 11 or the adhesive member 17 and the adhesive members 18 may be disposed to overlap the power supply part 11.

As shown in FIG. 2, a linear conductor 11a is connected to the power supply part 11. The linear conductor 11a is, for example, an anti-fogging heating wire formed on the glass plate 10, an antenna element, or a power supply wire for supplying electric power to the anti-fogging heating wire or the antenna element. In this specification, supplying electric power may means that the electric power supplied from the connection terminal 12 to the power supply part 11 through the spring member 16 is supplied to the linear conductor 11a. Alternatively, supplying electric power may mean that the electric power (e.g., a reception signal received by an antenna) supplied from the linear conductor 11a to the power supply part 11 is supplied to the connection terminal 12 through the spring member 16.

The power supply part 11 and the linear conductor 11a may be formed by printing a paste containing a conductive metal such as silver paste on the main surface of the glass plate 10 and baking the printed paste. Alternatively, the power supply part 11 and the linear conductor 11a may be formed by, for example, bonding a linear or foil-shaped body made of a conductive material such as copper to the main surface of the glass plate 10 using an adhesive or the like. In this embodiment, the method of forming the power supply part 11 and the linear conductor 11a is not limited to these methods, and instead may be formed by any other method. In this embodiment, a light shielding layer for shielding visible light may be formed on a part of the main surface of the glass plate 10, and the power supply part 11 and the connection terminal 12 may be provided on the light shielding layer. As the light shielding layer, ceramics such as black ceramics may be used. When a light shielding layer is provided at a part of the main surface of the glass plate 10, the glass plate 10 is treated as a configuration including the light shielding layer in this specification.

As shown in FIG. 1, the connection terminal 12 includes the base part 13, a male terminal part 14, and protrusions 15a and 15b. The base part 13 is disposed to face the glass plate 10. In other words, the base part 13 and the glass plate 10 are disposed in such a way that the main surface (the surface on the positive side in the z-axis direction) of the glass plate 10 faces the main surface (the surface on the negative side in the z-axis direction) of the base part 13 to be substantially parallel to each other. The male terminal part 14 is formed on the surface of the base part 13 on the positive side in the z-axis direction. The male terminal part 14 is a flat tab terminal to which an electric wire (not shown) is connected. As an example, the male terminal part 14 is formed in accordance with PA or PB of Japanese Industrial Standards JIS D5403 (1989).

The protrusions (15a and 15b) are optionally provided for the purpose of promoting the effect of controlling the spring member 16 as described below. The protrusions 15a and 15b are formed so as to protrude from the main surface of the base part 13 toward the glass plate 10 at both end parts of the base part 13 in the x-axis direction (see FIG. 1). The protrusions 15a and 15b extend in the y-axis direction (see FIG. 2). The protrusions 15a and 15b are configured to contact with the main surface of the glass plate 10 when the connection terminal 12 is attached to the glass plate 10. In other words, the height of the protrusions 15a and 15b (in the z-axis direction) is set lower than the height thereof in the (vertices of) protrusion direction when no external force is applied to the spring member 16. Thus, the spring member 16 disposed between the power supply part 11 and the base part 13 can be prevented from being deformed more than a predetermined amount from a state where no external force is applied. In this embodiment, the power supply part 11 may be formed so as to extend to the protrusions 15a and 15b, so that the power supply part 11 is brought into contact with the protrusions 15a and 15b. As shown in FIG. 2, the protrusions are not limited to configurations of the protrusions 15a and 15b extending in the y-axis direction, and instead the protrusion may be disposed at any position of the main surface of the base part and may be in any shape (in a plan view of the base part 13). For example, in addition to the protrusions 15a and 15b in FIG. 2, a protrusion may be provided at one or all of the four corners of the base part 13 in any shape. Further, the protrusions 15a and 15b may extend in the y-axis direction to the vicinity of two corners of the adhesive members 18a and 18b, respectively, and may be bent in a (in a plan view of the base part 13) U-shape extending in the x-axis direction.

The connection terminal 12 has conductivity, and may be formed by punching and pressing a thin plate of copper and the like to integrally form the connection terminal 12 and then plating the thin plate with tin, nickel or the like.

As shown in FIG. 1, the connection terminal 12 (base part 13) is bonded to (attached to) the glass plate 10 using the adhesive member 17 and the adhesive members 18*a* and 18*b*. As shown in FIG. 2, the adhesive member 17 is disposed so as to surround the periphery of the spring member 16 in a plan view, and a space formed by the glass plate 10, the base part 13, and the adhesive member 17 becomes a closed space (see FIG. 1). It is preferable that the adhesive member 17 be disposed in this manner, because it is possible to effectively prevent the intrusion of dust, water or the like into the contact points where the spring member 16 is brought into contact with the power supply part 11 and the base part 13. As the adhesive member 17, for example, a double-sided tape (acrylic foam tape, etc.) may be used. Note that the adhesive member 17 is not limited to an arrangement in which the adhesive member 17 surrounds the periphery of the spring member 16 in a plan view, and may instead have a structure in which a part of the periphery of the spring member 16 is opened if the base part 13 can be stably bonded to the glass plate 10.

As shown in FIGS. 1 and 2, the adhesive members 18*a* and 18*b* bond the base part 13 to the glass plate 10 on both sides of the x-axis direction. A urethane resin, for example, may be used for the adhesive members 18*a* and 18*b*. Further, the adhesive members 18*a* and 18*b* may be disposed outside the adhesive member 17 in a plan view. Further, the adhesive member 17 such as a double-sided tape may be controlled so as to maintain the height of the spring member 16 and the height of the adhesive members 18*a* and 18*b* such as a urethane resin by maintaining the distance (height) between the glass plate 10 and the base part 13. When the connection terminal 12 can be sufficiently fixed to the glass plate 10 by the adhesive member 17, the adhesive members 18 (18*a* and 18*b*) may be optionally provided. That is, the adhesive member may be composed of only the adhesive member 17. In this case, the "adhesive member" includes only the first adhesive member.

In the electrical connection structure 1 according to this embodiment, the adhesive member 17 may be used as an adhesive member for temporary fixing, and the adhesive members 18*a* and 18*b* may be used as an adhesive member for full fixing. That is, the adhesive member (e.g., double-sided tape) 17 may be used as an adhesive member for temporary fixing until the adhesive members (e.g., urethane resin) 18*a* and 18*b* are solidified. The connection terminal 12 (base part 13) can be stably and reliably fixed to the glass plate 10 by selectively using the two types of adhesive members.

As shown in FIG. 1, the spring member 16 is disposed between the power supply part 11 and the base part 13, and electrically connects the power supply part 11 to the base part 13. Here, "electrically connect" means that the power supply part 11 and the base part 13 are connected in a DC manner. The spring member 16 includes a fixing part 21, a curved part 22, and contact parts 23. Specifically, as shown in FIG. 2, the spring member 16 includes the fixing part 21, the curved part 22 (branch parts 26*a* and 26*b*), and contact parts 23*a* and 23*b*. In this specification, when the "contact parts 23*a* and 23*b*", etc. are collectively referred to, reference numerals "a", "b", etc. are omitted and they are referred to as the "contact part 23". In this specification, the contact part 23*a* and the contact part 23*b* are also referred to as a first contact part and a second contact part, respectively.

As shown in FIG. 1, the spring member 16 is fixed to the base part 13 at the fixing part 21. The curved part 22 extends from the fixing part 21 in the x-axis direction parallel to the main surface of the base part 13, and is curved such that the central part of the curved part 22 protrudes toward the glass plate 10 (negative side in the z-axis direction). Note that the central part can be freely set at a part not adjacent to the fixing part 21 and the contact part 23. For example, the central part may be set at between the lengths of the curved part 22 from 0.2 to 0.8 in the x-axis direction, when the length of the curved part 22 in the x-axis direction is defined as "1" if the spring member 16 is viewed from the z-axis direction. As shown in FIG. 2, the curved part 22 includes the branch parts 26*a* and 26*b* branched by a slit 25 extending in the x-axis direction. In the example shown in FIG. 2, the slit 25 extends toward the positive side in the x-axis direction starting from an end part of the fixing part 21 on the positive side in the x-axis direction. In this specification, the branch part 26*a* and the branch part 26*b* are also referred to as a first branch part and a second branch part, respectively, and the direction toward the positive side in the x-axis direction is also referred to as a first direction.

The contact parts 23*a* and 23*b* are formed at the end parts of the branch parts 26*a* and 26*b*, respectively, on the positive side in the x-axis direction. As shown in FIGS. 1 and 2, the surface of the contact part 23*a* on the positive side in the z-axis direction is in contact with the main surface (the surface on the negative side in the z-axis direction) of the base part 13. Thus, the contact part 23*a* is electrically connected to the base part 13. The surface of the contact part 23*b* on the positive side in the z-axis direction is in contact with the main surface (the surface on the negative side in the z-axis direction) of the base part 13. Thus, the contact part 23*b* is electrically connected to the base part 13. That is, the contact parts 23*a* and 23*b* are in contact with the base part 13 independently of each other.

For example, as shown in FIG. 2, an area where the base part 13 is in contact with the fixing part 21 is larger than the sum of an area where the base part 13 is in contact with the contact part 23*a* and an area where the base part 13 is in contact with the contact part 23*b*. Further, for example, as shown in FIG. 2, each of the contact parts 23*a* and 23*b* has a substantially quadrangular shape when viewed from the z-axis direction, and the length of the side extending in the y-axis direction and the length of the side extending in the x-axis direction of each of the contact parts 23*a* and 23*b* can be freely determined. As shown in FIG. 2, the length of the side of each of the contact parts 23*a* and 23*b* extending in the y-axis direction may be greater than the length of the side of the corresponding one of the contact parts 23*a* and 23*b* extending in the x-axis direction. The y-axis direction is also referred to as a second direction.

As shown in FIG. 1, the curved part 22 is in contact with the power supply part 11 at the contact parts 24 protruding toward the glass plate 10, whereby the curved part 22 is electrically connected to the power supply part 11. Specifically, as shown in FIG. 2, the branch part 26*a* is in contact with the power supply part 11 at a contact part 24*a* protruding toward the glass plate 10, whereby the branch part 26*a* (curved part 22) is electrically connected to the power supply part 11. The branch part 26*b* is in contact with the power supply part 11 at a contact part 24*b* protruding toward the glass plate 10, whereby the branch part 26*b* (curved part 22) is electrically connected to the power supply part 11. In this specification, the contact part 24*a* and the contact part 24*b* are also referred to as a third contact part and a fourth contact part, respectively.

The spring member 16 may be formed of, for example, a metal material such as a beryllium copper alloy. In this case, the spring member 16 may be integrally formed by punching and pressing a plate material formed of a metal such as a beryllium copper alloy. The spring member 16 may be subjected to a metal plating treatment such as a gold plating treatment or a silver plating treatment.

Figure 3:
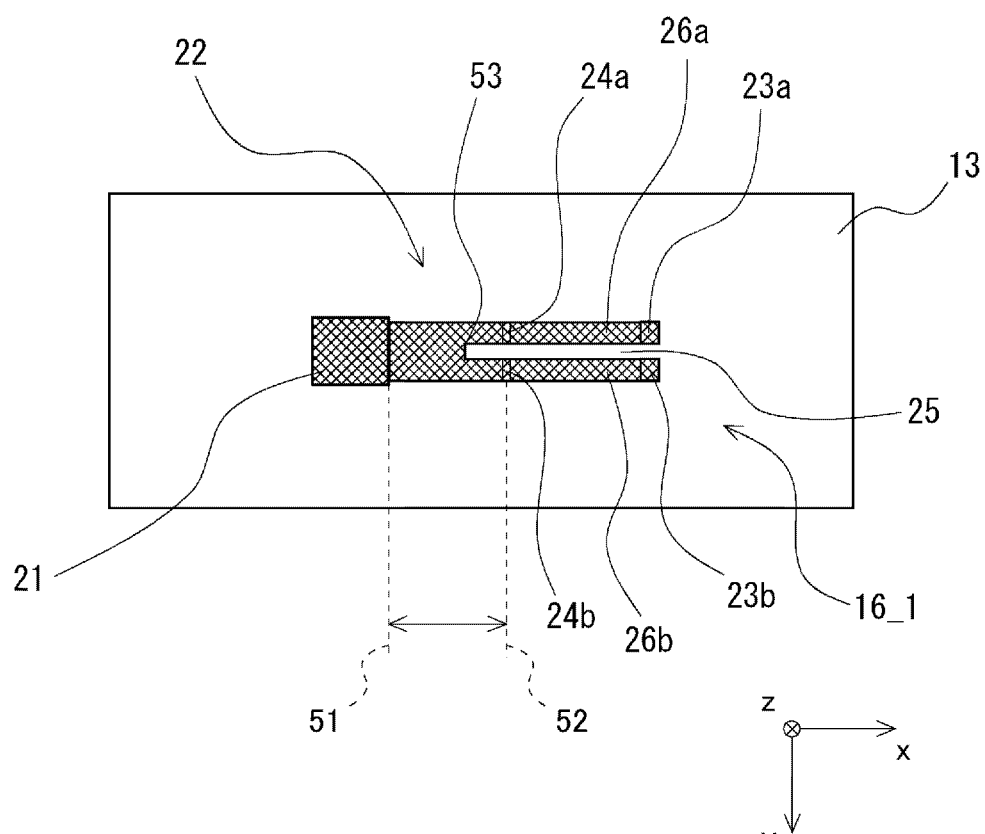
FIG. 3 is a plan view for explaining another example of a configuration of a spring member.
Figure 4:
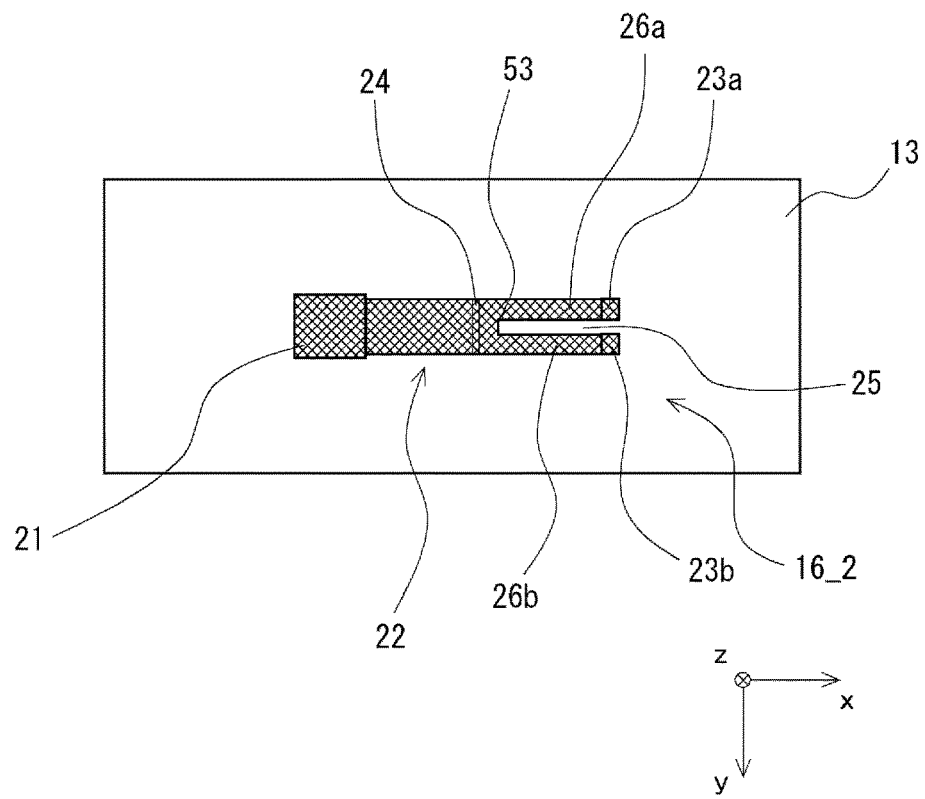
FIG. 4 is a plan view for explaining another example of the configuration of the spring member.

FIGS. 3 and 4 are plan views for explaining another example of the configuration of the spring member.

As shown in a spring member 16_1 shown in FIG. 3, a spring member as another example of the configuration may be configured in such a way that the slit 25 extends from a starting point 53 toward the positive side in the x-axis direction, where the starting point 53 of the slit 25 is located at a position between a position 51 of the side (extending in the y-axis direction) of the fixing part 21 on the positive side in the x-axis direction and a position 52 of the contact parts 24a and 24b. That is, as shown in FIG. 3, the starting point 53 of the slit 25 may be located at a position closer to the fixing part 21 than the contact parts 24 are at a position farther on the positive side in the x-axis direction (contact part 23 side) than the end part of the fixing part 21 is, and the respective branch parts 26a and 26b may be branched from the middle part of the curved part 22. With such a configuration, the strength at the branch point (the starting point 53) of the curved part 22 can be enhanced. The starting point 53 of the slit 25 may be located at a position included in the contact parts 24. That is, a configuration in which the starting point 53 of the slit 25 is located at the contact parts 24, and the width of the third contact part in the x-axis direction and the width of the fourth contact part in the x-axis direction are shorter than the width of the contact part 24 in the x-axis direction may be employed as a configuration including the third contact part and the fourth contact part.

In this embodiment, as in a spring member 16_2 shown in FIG. 4, the starting point 53 of the slit 25 may be located at a position on the positive side in the x-axis direction including the end parts of the contact parts 24 on the positive side in the x-axis direction, and the slit 25 may extend from the starting point 53 toward the positive side in the x-axis direction. For example, as shown in FIG. 4, the starting point 53 of the slit 25 may be located at a position farther on the positive side in the x-axis direction (contact part 23 side) than the contact parts 24 are, and the branch parts 26a and 26b may be branched from the middle part of the curved part 22. With such a configuration, the contact area where the contact parts 24 are brought into contact with the power supply part 11 can be increased.

Figure 5:
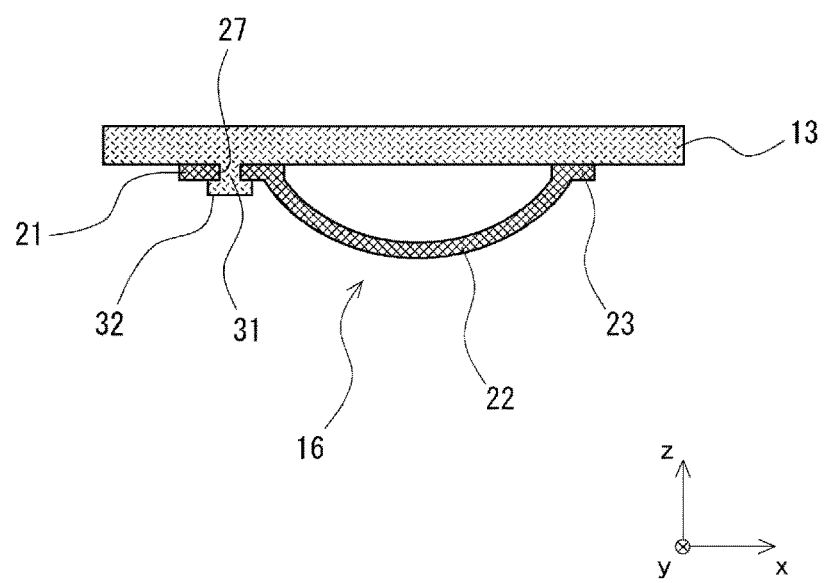
FIG. 5 is a cross-sectional view for explaining an example of a method of fixing a spring member to a base part.

FIG. 5 is a cross-sectional view for explaining an example of a method of fixing the spring member 16 to the base part 13, and is an enlarged cross-sectional view in the vicinity of the spring member 16. For example, as shown in FIG. 5, a through hole 27 is formed in the spring member. The fixing part 21 can be fixed to the base part 13 by inserting a projection 31 of the base part 13 into the through hole 27. In the configuration shown in FIG. 5, the projection 31 of the base part 13 is made to pass through the through hole 27 of the fixing part 21, and a leading end of the projection 31 is made larger than an inner diameter of the through hole 27 to form an enlarged diameter part 32 on the surface of the fixing part 21 on the glass plate 10 side (the surface on the negative side in the z-axis direction). Thus, the fixing part 21 can be fixed to the base part 13. Note that "the leading end of the projection 31 is larger than the inner diameter of the through hole 27" means that an outer edge of the projection 31 is positioned outside the inner diameter of the through hole 27 on the surface on the glass plate 10 side (surface on the negative side in the z-axis direction).

Figure 6:
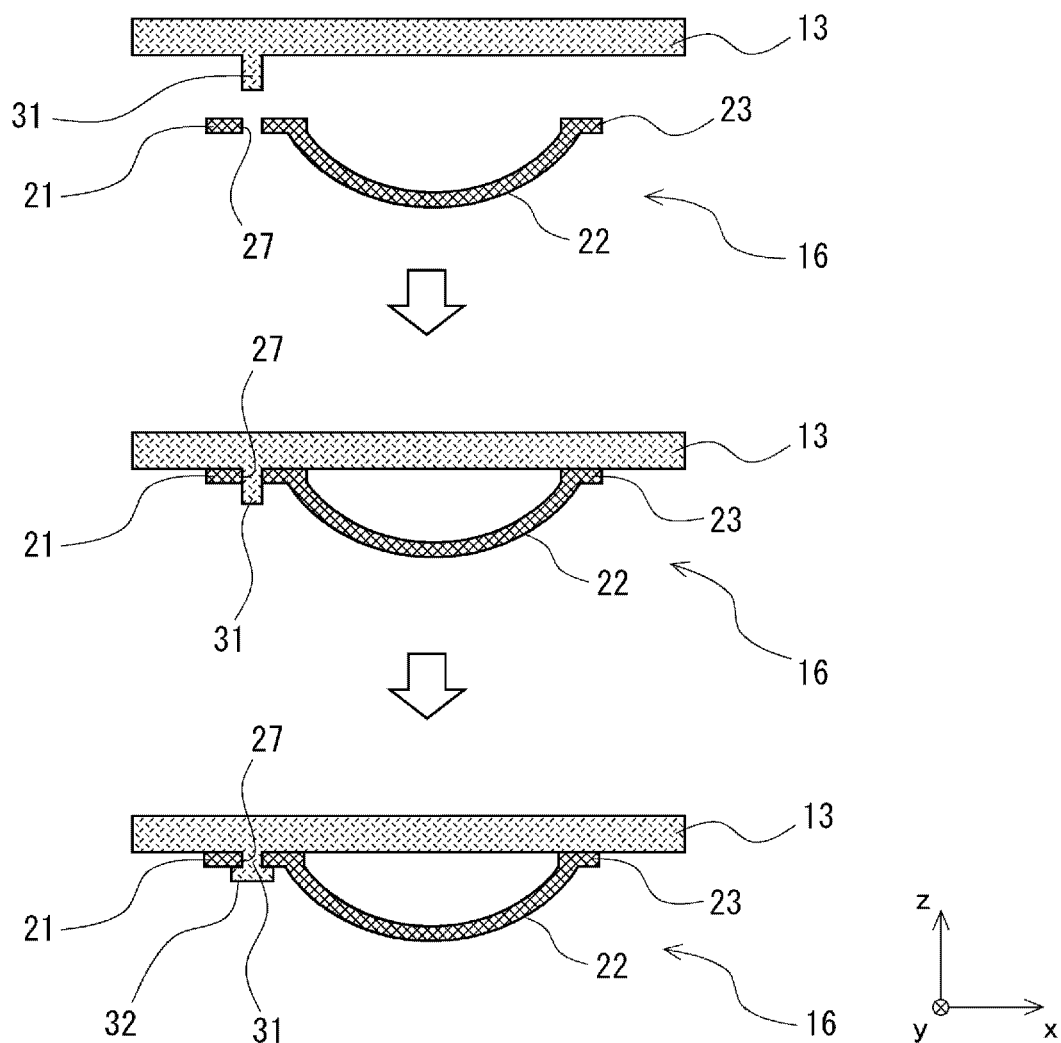
FIG. 6 is a cross-sectional view for explaining an example of the method of fixing the spring member to the base part.

A method of fixing the spring member 16 to the base part 13 will be described in detail with reference to FIG. 6. First, the through hole 27 is formed in the fixing part 21 of the spring member 16. The base part 13 (connection terminal 12) having the projection 31 formed on the main surface is prepared. The projection 31 of the base part 13 is inserted into the through hole 27 of the fixing part 21. After that, the leading end of the projection 31 is made larger than the inner diameter of the through hole 27 on the surface of the fixing part 21 on the glass plate 10 side (the surface on the negative side in the z-axis direction). For example, since the projection 31 is made of a metal material, the fixing part 21 can be fixed to the base part 13 by crushing and expanding the projection 31 from the negative side in the z-axis direction to form the enlarged diameter part 32. At this time, since the base part 13 and the spring member 16 are in direct contact with each other, the base part 13 and the spring member 16 are electrically connected to each other.

Figure 7:
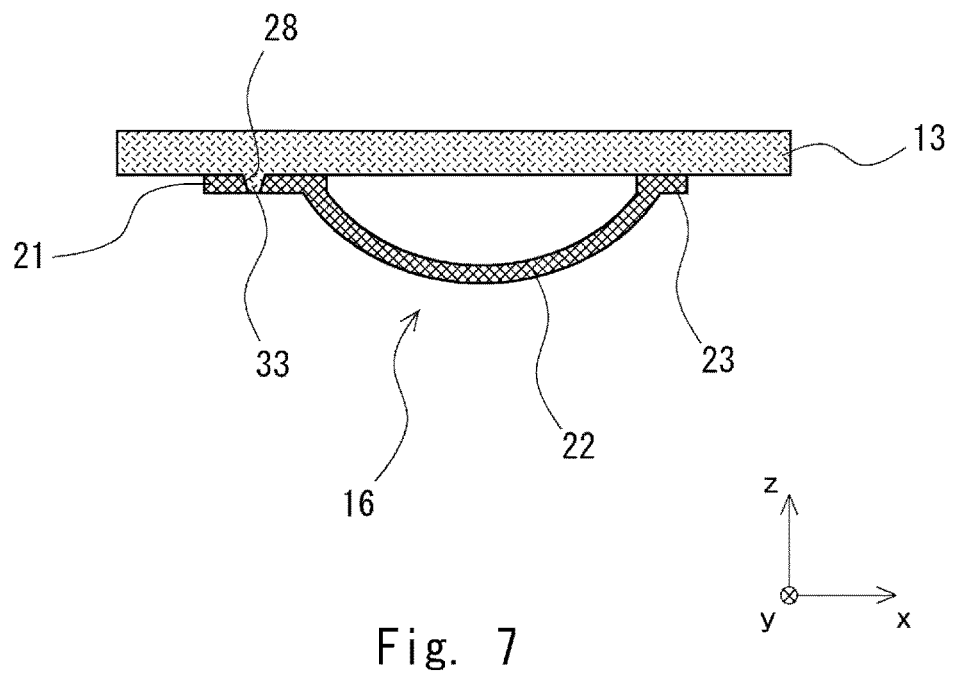
FIG. 7 is a cross-sectional view for explaining another example of the method of fixing a spring member to a base part.

In this embodiment, as shown in FIG. 7, the fixing part 21 may be fixed to the base part 13 by forming a through hole 28 in the fixing part 21 of the spring member 16 and fitting a projection 33 of the base part 13 into the through hole 28. In the example shown in FIG. 7, the fixing part 21 is fixed to the base part 13 by fitting the projection 33 into the through hole 28 having a tapered shape. The configurations shown in FIGS. 5 to 7 are an example, and in this embodiment, the spring member 16 (fixing part 21) may be fixed to the base part 13 by any other method (by other configurations). For example, the fixing part 21 of the spring member 16 may be welded and fixed to the base part 13.

As described above, in the electrical connection structure 1 (see FIG. 1) according to this embodiment, the power supply part 11 is in contact with the base part 13 with the spring member 16 interposed therebetween, and the spring member 16 electrically connects the power supply part 11 to the base part 13. Specifically, the spring member 16 is electrically connected to the power supply part 11 at the contact parts 24 of the curved part 22. The spring member 16 is electrically connected to the base part 13 at the fixing part 21 and the contact parts 23a and 23b.

Since the spring member 16 includes the curved part 22, when the spring member 16 is compressed in the thickness direction (z-axis direction), a repulsive force is generated. In the electrical connection structure 1 according to this embodiment, as shown in FIG. 1, the spring member 16 is compressed and held between the power supply part 11 (glass plate 10) and the base part 13. Thus, a constant stress acts on the power supply part 11 on the negative side in the z-axis direction from the contact parts 24 of the curved part 22. Further, a constant stress acts on the base part 13 on the positive side in the z-axis direction from the fixing part 21 and the contact parts 23a and 23b. Thus, contact between the contact parts 24 of the curved part 22 and the power supply part 11 and contact between the fixing part 21 and the contact parts 23a and 23b and the base part 13 are stabilized, so that the power supply part 11 can be stably connected to the base part 13 by using the spring member 16.

In the electrical connection structure 1 according to this embodiment, as shown in FIG. 2, the slit 25 is formed in the spring member 16, and the curved part 22 is branched into the branch parts 26a and 26b. The contact parts 23a and 23b are formed in the branch parts 26a and 26b, respectively, so that the contact parts 23a and 23b are brought into contact with the base part 13 independently of each other. It is thus possible to reduce fluctuations in the connection state (contact area) between the power supply part 11 and the spring member 16 on the glass plate 10 and fluctuations in the connection state (contact area) between the base part 13 and the spring member 16. Thus, fluctuations in the electrical current flowing between the power supply part 11 and the base part 13 through the spring member 16 can be reduced, so that the power supply part 11 on the glass plate 10 and the connection terminal 12 (base part 13) can be stably connected by using the spring member 16.

In particular, when the starting point of the slit 25 of the spring member 16 is located at a position farther on the negative side in the x-axis direction than the contact parts 24 are (see FIGS. 2 and 3), it becomes easy to bring the contact parts 24a and 24b into contact with the power supply part 11 independently of each other. That is, when the spring member 16 is configured as described above, the branch part 26a including the contact part 23a and the contact part 24a and the branch part 26b including the contact part 23b and the contact part 24b can be easily displaced independently of each other. Thus, the contact parts 23a and 23b can be easily brought into contact with the base part 13 independently of each other, and the contact parts 24a and 24b can be brought into contact with the power supply part 11 independently of each other. In this way, even when the main surface of the glass plate 10 and the main surface of the base part 13 are displaced from each other, it is easy to make the contact parts 24a and 24b of the branch parts 26a and 26b follow the displacement. Hence, the connection between the power supply part 11 on the glass plate 10 and the connection terminal 12 (base part 13) can be stabilized. The effects of the present disclosure will be described in detail below.

Figure 8:
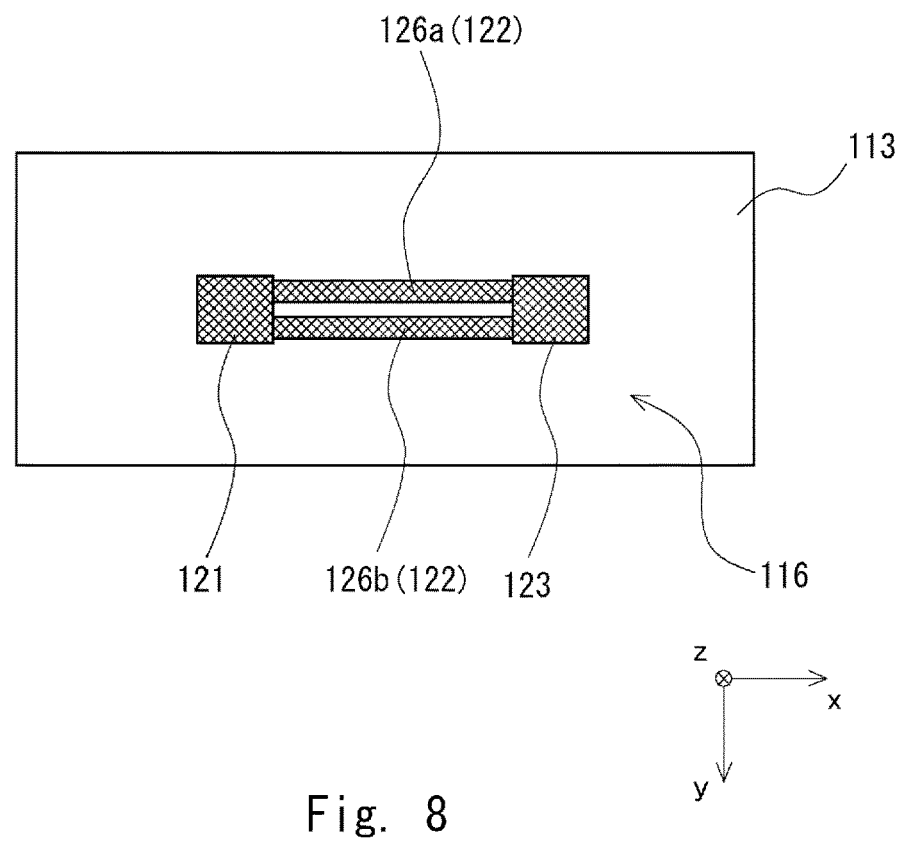
FIG. 8 is a diagram for explaining an electrical connection structure according to a comparative example.

FIG. 8 shows an electrical connection structure according to a comparative example, and is a diagram for explaining the vicinity of a spring member 116 in detail. In the electrical connection structure according to the comparative example, each component is represented by a number in the 100s. As shown in FIG. 8, in the electrical connection structure according to the comparative example, a fixing part 121 of the spring member 116 is fixed to a base part 113. A curved part 122 (branch parts 126a and 126b) is formed to extend from the fixing part 121 toward the positive side in the x-axis direction. A contact part 123 is formed at the end parts of the branch parts 126a and 126b on the positive side in the x-axis direction. In the comparative example shown in FIG. 8, the contact part 123 of the spring member 116 is connected to both the branch parts 126a and 126b, and the contact part 123 is composed of one part.

Figure 9:
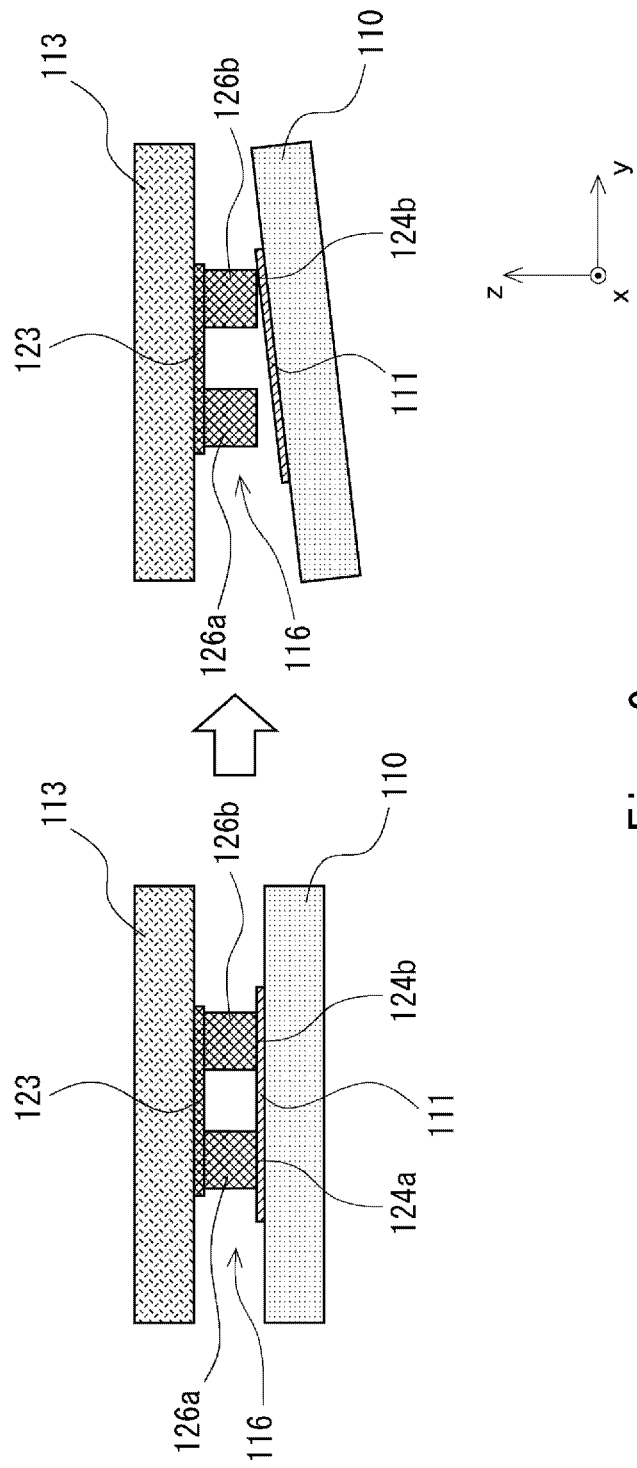
FIG. 9 is a diagram for explaining the electrical connection structure according to the comparative example.

FIG. 9 shows the electrical connection structure according to a comparative example, and shows the vicinity of the spring member 116 as viewed from the x-axis direction. As shown in the left view of FIG. 9, also in the comparative example, the spring member 116 is disposed between the power supply part 111 (glass plate 110) and the base part 113, and electrically connects the power supply part 111 to the base part 113. At this time, the branch parts 126a and 126b of the spring member 116 are in contact with the power supply part 111 at the contact parts 124a and 124b, respectively, and the contact part 123 of the spring member 116 is in contact with the base part 113.

In the electrical connection structure according to the comparative example, when the main surface of the glass plate 110 and the main surface of the base part 113 are not parallel to each other, the branch part 126a is not brought into contact with the power supply part 111, as shown in the right view of FIG. 9. That is, in the comparative example shown in FIG. 8, since both of the branch parts 126a and 126b of the spring member 116 are connected by the contact part 123, the branch parts 126a and 126b cannot be displaced independently of each other. For this reason, when the main surface of the glass plate 110 and the main surface of the base part 113 are not parallel to each other, for example, the branch part 126a may not be brought into contact with the power supply part 111 (the state in which the contact part 124a is not present) or the contact area where the contact part 124a is brought into contact with the power supply part 111 may become smaller than that when the main surface of the glass plate 110 and the main surface of the base part 113 are parallel to each other. In this case, the contact area where the contact part 124b is brought into contact with the power supply part 111 may become smaller than that when the main surface of the glass plate 100 and the main surface of the base part 113 are parallel to each other. When the branch part 126a is thus separated from the power supply part 111, only the branch part 126b (contact part 124b) comes into contact with the power supply part 111, and the contact between the spring member 116 and the power supply part 111 becomes unstable. Consequently, the electrical current flowing between the connection terminal (base part 113) and the power supply part 111 also becomes unstable.

Figure 10:
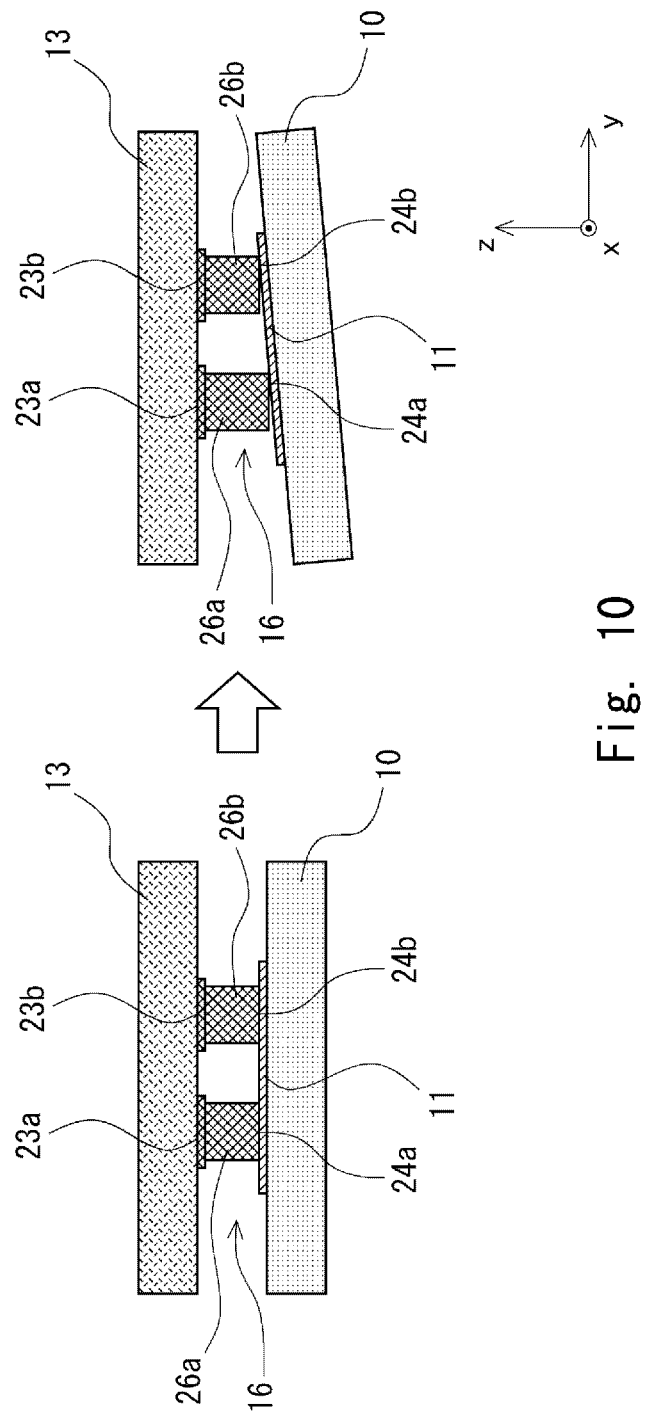
FIG. 10 is a diagram for explaining an effect of the present disclosure.

On the other hand, as in the electrical connection structure according to this embodiment, the spring member 16 (see FIGS. 2 to 4) including the slit 25 brings the contact parts 24a and 24b into contact with the power supply part 11 independently of each other. That is, when the spring member 16 is configured as described above, the branch part 26a including the contact part 23a and the contact part 24a and the branch part 26b including the contact part 24b and the contact part 24b can be displaced independently of each other. Thus, as shown in the right view of FIG. 10, even when the main surface of the power supply part 11 (glass plate 10) and the main surface of the base part 13 are not parallel to each other, the contact part 24a of the branch part 26a and the contact part 24b of the branch part 26b can be brought into contact with the power supply part 11, and the contact areas where the contact part 24a and the contact part 24b are brought into contact with the power supply part 11 are less likely to be smaller than that when the main surface of the power supply part 11 and the main surface of the base part 13 are parallel to each other. That is, even when the distance between the main surface of the power supply part 11 and the main surface of the base part 13 is increased at a position corresponding to the branch part 26a, the branch part 26a can be displaced independently, and thus the branch part 26a can be displaced following the main surface of the power supply part 11. Therefore, both the contact part 24a of the branch part 26a and the contact part 24b of the branch part 26b can be brought into contact with the power supply part 11. As a result, the electrical current flowing between the connection terminal 12 (base part 13) and the power supply part 11 can also be stabilized.

In other words, in the electrical connection structure according to this embodiment, each of the contact parts 23a and 23b is configured to freely slide the main surface of the base part 13 in the x-axis direction independently of each other. Further, in a state where the spring member 16 is compressed (in the z-axis direction) between the base part 13 and the power supply part 11 (glass plate 10), each of the contact parts 24a and 24b of the branch parts 26a and 26b is configured to be displaced in the z-axis direction (thickness direction) and to freely slide the main surface of the power supply part 11 in the x-axis direction independently of each other. Thus, the power supply part 11 on the glass plate 10 can be connected to the connection terminal 12 (base part 13) stably by using the spring member 16. In the configuration including the (one) contact part 24 as in the spring member 16_2 shown in FIG. 4, even when the main surface of the power supply part 11 (glass plate 10) and the main surface of the base part 13 are not parallel to each other, the contact parts 23a and 23b slide freely the main surface of the base part 13 in the x-axis direction independently of each other, so that the contact area where the contact parts 24 are brought into contact with the power supply part 11 is less likely to become smaller than that when the main surface of the power supply part 11 and the main surface of the base part 13 are parallel to each other. As a result, the electrical current flowing between the connection terminal 12 (base part 13) and the power supply part 11 can also be stabilized.

It is thus possible to reduce fluctuations in the connection (contact area) between the power supply part 11 on the glass plate 10 and the spring member 16 and fluctuations in the connection (contact area) between the base part 13 and the spring member 16. It is thus possible to reduce fluctuations in the electrical current flowing between the power supply part 11 and the base part 13 through the spring member 16, and the power supply part 11 on the glass plate 10 can be stably connected to the connection terminal 12 (base part 13).

Next, another configuration example of the electrical connection structure according to this embodiment will be described.

Figure 11:
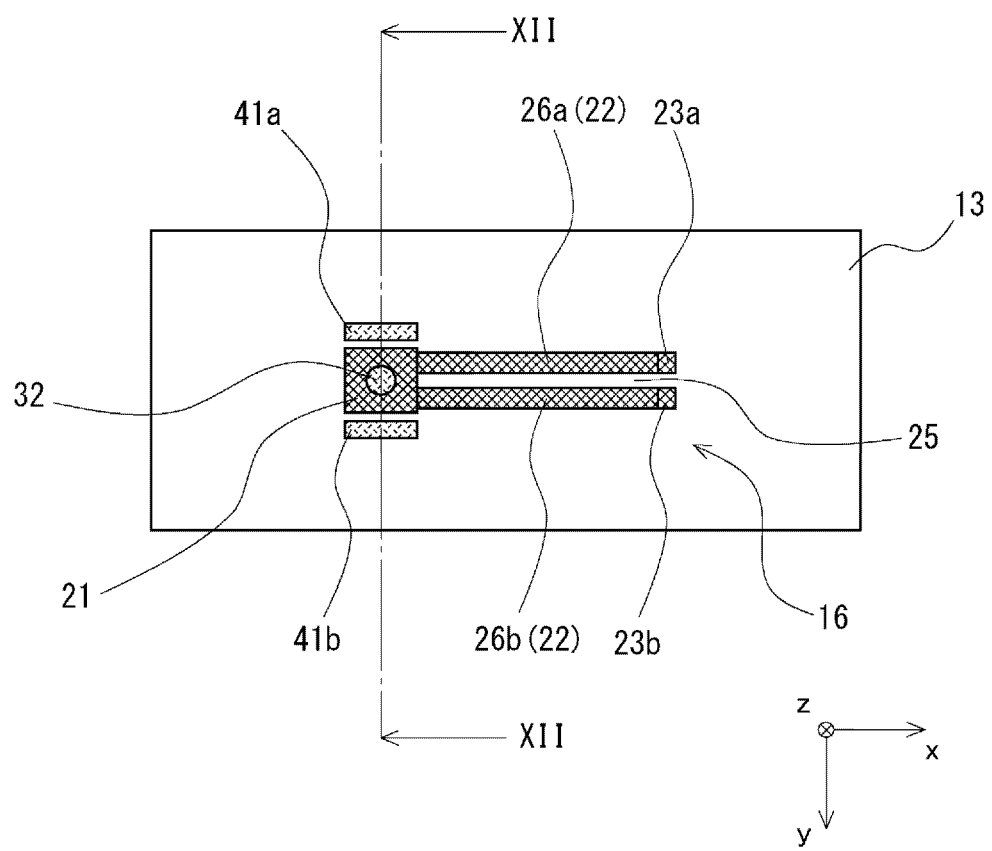
FIG. 11 is a plan view for explaining an example of an arrangement of the spring member and weir parts.
Figure 12:
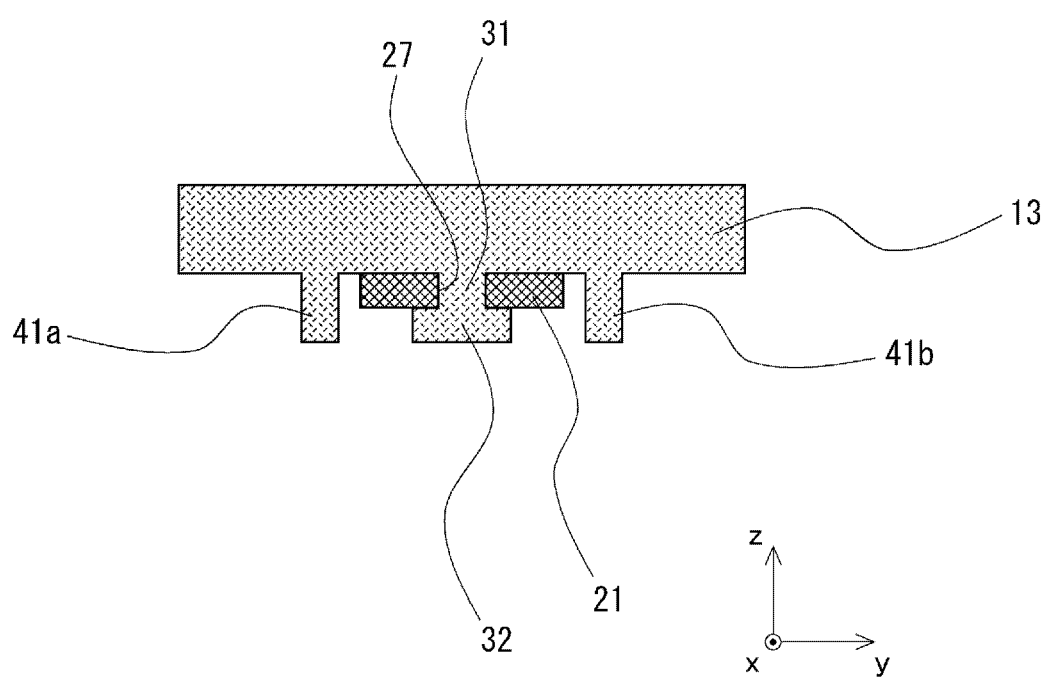
FIG. 12 is a cross-sectional view taken along the cross-sectional line XII-XII of FIG. 11.

FIG. 11 is a diagram for explaining another example of the configuration of the electrical connection structure according to this embodiment, and is a plan view for explaining an arrangement of a spring member and weir parts. FIG. 12 is a cross-sectional view taken along a cross-sectional line XII-XII of FIG. 11.

As shown in FIG. 5, when one through hole 27 is formed in the fixing part 21 of the spring member 16, the projection 31 is made to penetrate through the through hole 27, and the spring member 16 is fixed by forming the enlarged diameter part 32 at the leading end of the projection 31, the spring member 16 may rotate around the through hole 27 and be displaced.

In the configuration examples shown in FIGS. 11 and 12, in order to reduce the rotation of the spring member 16, weir parts 41a and 41b are provided around the fixing part 21 of the spring member 16. The weir parts 41a and 41b are formed on the base part 13, and are formed to protrude from the main surface of the base part 13 toward the glass plate 10 (negative side in the z-axis direction). The weir parts 41a and 41b may be formed integrally with the base part 13 when the connection terminal 12 is formed. If the weir parts 41a and 41b are provided around the fixing part 21 as described above, when the spring member 16 is about to rotate, the fixing part 21 of the spring member 16 contacts with the weir parts 41a and 41b, thereby reducing the rotation of the spring member 16 around the through hole 27.

In the configuration example shown in FIG. 11, the fixing part 21 of the spring member 16 has a polygonal shape in a plan view, and particularly shows an example when the spring member 16 has a quadrangular shape. The weir parts 41a and 41b are provided at positions facing the respective two sides parallel to the x-axis direction from among the sides of the quadrangular fixing part 21. The weir parts 41a and 41b are formed to extend in the x-axis direction. As shown in FIG. 12, the heights of the weir parts 41a and 41b may be greater than or equal to the height of the fixing part 21. With such a configuration, the rotation of the spring member 16 can be effectively reduced. The polygonal shape of the fixing part 21 in a plan view is not particularly limited and may be a triangular shape, a pentagonal shape, a hexagonal shape, or the like. For example, when the fixing part 21 has a (regular) hexagonal shape, the two weir parts (41a and 41b) may be provided at positions facing the respective two sides parallel to the x-axis direction. As the quadrangular shape in a plan view, the fixing part 21 typically has a rectangular or square shape in a plan view.

Figure 13:
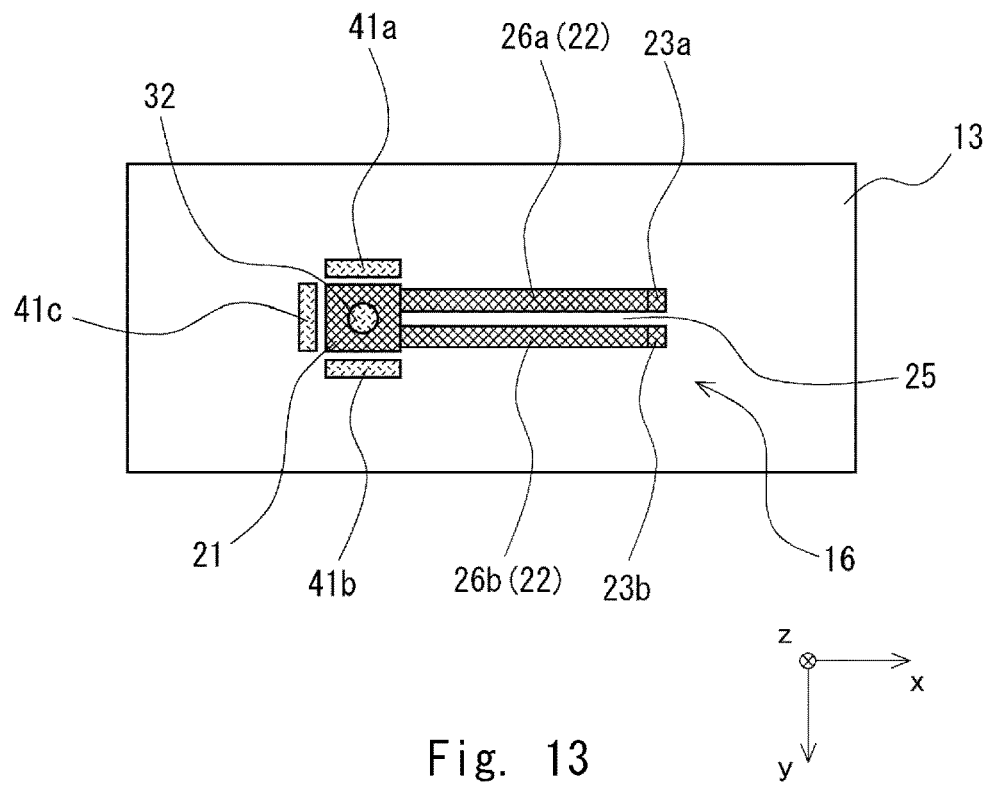
FIG. 13 is a plan view for explaining an example of an arrangement of the spring member and weir parts.
Figure 14:
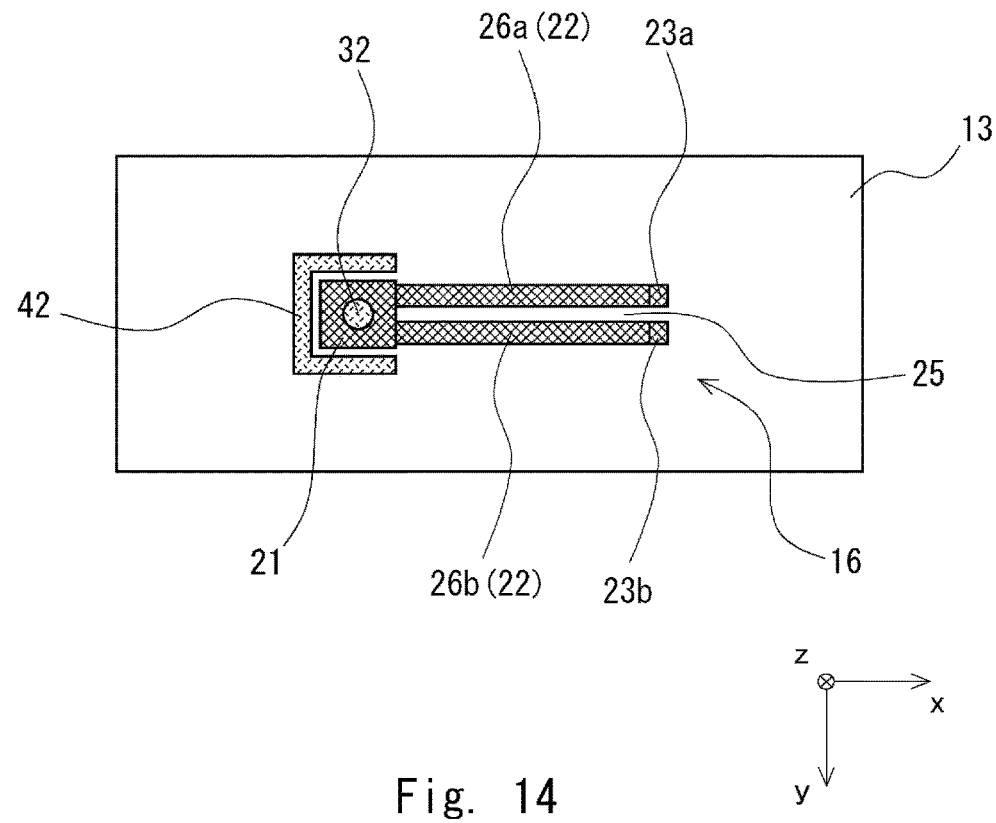
FIG. 14 is a plan view for explaining an example of an arrangement of the spring member and a weir part.

In this embodiment, as shown in FIG. 13, the weir parts 41a, 41b, and 41c may be provided at positions facing the respective three sides of the fixing part 21 from among the sides of the fixing part 21 of the spring member 16 other than a side of the fixing part 21 on the curved part 22 side. Although FIG. 13 shows a configuration in which the weir parts 41a, 41b, and 41c are provided separately, as shown in FIG. 14, a continuing weir part 42 may be formed (U-shaped) to surround the periphery of the fixing part 21.

In this embodiment, at least one weir part may be provided at a position facing at least one side around the fixing part 21 of the spring member 16. For example, only the weir part 41a shown in FIG. 11 may be provided, or only the weir part 41b may be provided. Alternatively, only the weir part 41c shown in FIG. 13 may be provided. By providing at least one weir part around the fixing part 21 of the spring member 16 in this manner, the rotation of the spring member 16 can be reduced. Although the arrangement of the weir parts in the case where the fixing part 21 has a polygonal shape when viewed from the z-axis direction has been mainly described, the shape of each weir part is not limited to the above. In other words, if the fixing part 21 has a shape other than a polygon (when viewed from the z-axis direction) such as a shape including a curve in a part of the outer edge, a circular shape, or an elliptical shape, a weir part having a predetermined shape (e.g., a shape including a curve) may be provided in an arrangement corresponding to the shape of the fixing part 21 so that the spring member 16 reduces the rotation about the through hole 27.

Figure 15:
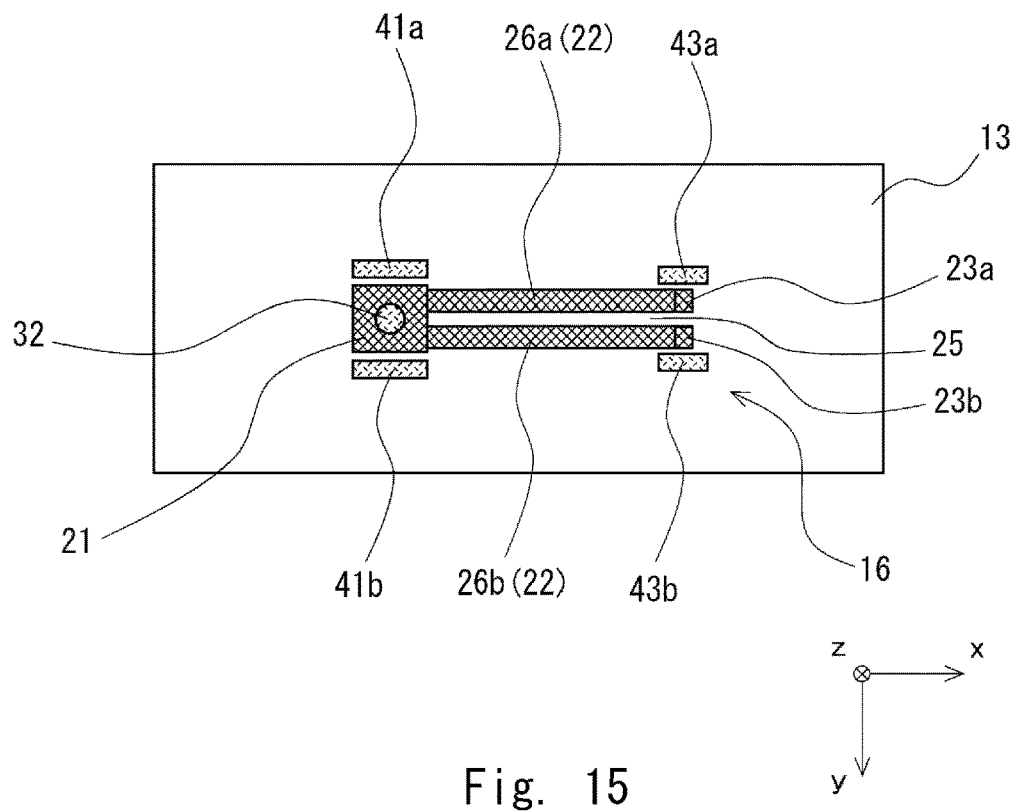
FIG. 15 is a plan view for explaining an arrangement example of the spring member, weir parts, and wall parts.

As shown in FIG. 15, in the electrical connection structure according to this embodiment, wall parts 43a and 43b may be provided around the contact parts 23a and 23b, respectively. The wall parts 43a and 43b are formed on the base part 13 so as to protrude from the main surface of the base part 13 toward the glass plate 10 (negative side in the z-axis direction). The wall parts 43a and 43b may be formed integrally with the base part 13 when the connection terminal 12 is formed. In this specification, the wall parts 43a and the wall part 43b are also referred to as a first wall part and a second wall part, respectively. When the first wall part and the second wall part are provided with spaces so as not to be in contact with the branch parts 26a and 26b and the contact parts 23a and 23b in a state where the main surface of the power supply part 11 (glass plate 10) and the main surface of the base part 13 are parallel to each other, the contact parts 23a and 23b can easily slide.

As shown in FIG. 15, the wall part 43a is formed to extend in the x-axis direction on the opposite side of the slit 25 of the contact part 23a. The wall part 43b is formed so as to extend in the x-axis direction on the opposite side of the slit 25 of the contact part 23b. The heights of the wall parts 43a and 43b may be greater than or equal to the height of the contact parts 23a and 23b. In addition to the first wall part and the second wall part, a third wall part (not shown) extending in the x-axis direction may be provided between the slit 25 as needed. In the third wall part (not shown), if a space is provided so as not to be in contact with the branch parts 26a and 26b and the contact parts 23a and 23b in a state where the main surface of the power supply part 11 (glass plate 10) and the main surface of the base part 13 are parallel to each other, the contact parts 23*a* and 23*b* can easily slide. As the wall part, only the first and second wall parts may be provided and the third wall part may not be provided.

By providing the wall parts 43*a* and 43*b* around the contact parts 23*a* and 23*b* in this manner, the rotation of the spring member 16 can be effectively reduced. When the connection terminal 12 is attached to the glass plate 10, the contact parts 23*a* and 23*b* of the spring member 16 slide the main surface of the base part 13 to the positive side in the x-axis direction. By providing the wall parts 43*a* and 43*b* in this manner, the sliding of the contact parts 23*a* and 23*b* in the x-axis direction can be guided. More specifically, when the connection terminal 12 is attached to the glass plate 10, the direction in which the contact parts 23*a* and 23*b* slide can be prevented from shifting in the y-axis direction. Thus, the spring member 16 can be prevented from shifting when the connection terminal 12 is attached to the glass plate 10.

In this embodiment, two or more through holes may be formed in the fixing part 21 of the spring member 16 in order to reduce the rotation of the spring member 16. In this case, since the spring member 16 can be fixed to the base part 13 at a plurality of parts of the base part 13 by penetrating the projections of the base part 13 through the two or more through holes, the above-described weir part or the wall part may not be provided if the spring member 16 can be stably fixed to the base part 13.

Figure 16:
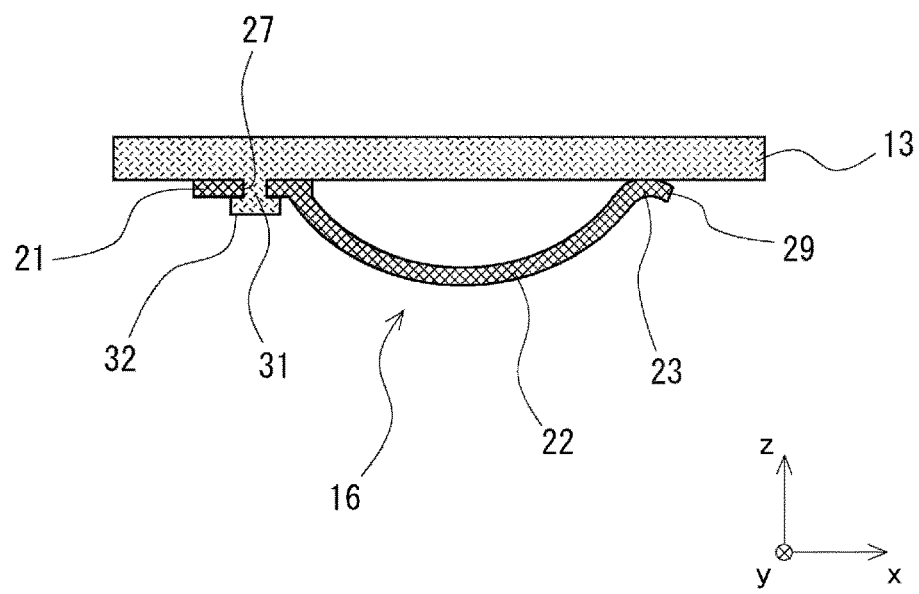
FIG. 16 is a cross-sectional view for explaining another example of the configuration of the spring member.

FIG. 16 is a cross-sectional view for explaining another configuration example of the spring member. As shown in FIG. 16, the spring member 16 may further include non-contact parts 29 at the end parts of the respective contact parts 23 on the positive side in the x-axis direction. The non-contact parts 29 extend further in the x-axis direction from the contact parts 23 and are configured not to be in contact with the base part 13. If the non-contact parts 29 are provided in this manner, when the connection terminal 12 is attached to the glass plate 10, the contact parts 23*a* and 23*b* can be smoothly slid to the positive side in the x-axis direction. In particular, since the spring member 16 has the non-contact parts 29 in a state where the spring member 16 is compressed (in the z-axis direction) between the base part 13 and the power supply part 11 (glass plate 10), it has an effect of reducing variations in the contact area of the contact parts 23*a* and 23*b*. In this specification, the non-contact part connected to the first contact part 23*a* is also referred to as a first non-contact part, and the non-contact part connected to the second contact part 23*b* is also referred to as a second non-contact part.

Figure 17:
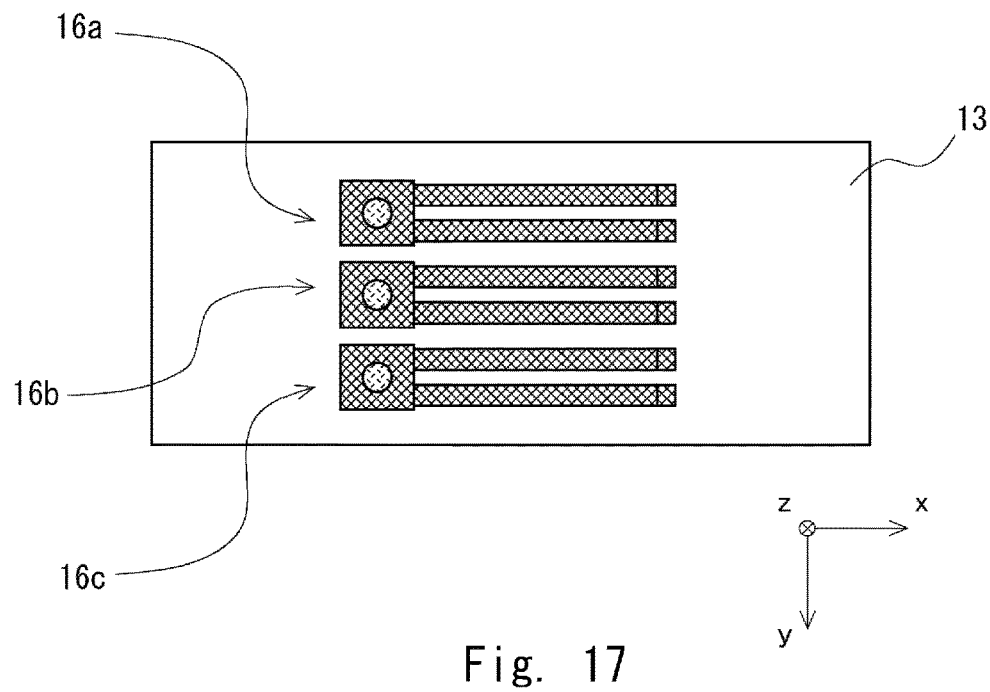
FIG. 17 is a plan view for explaining another example of the configuration of the spring member.

In this embodiment, as shown in FIG. 17, a plurality of spring members 16*a* to 16*c* may be fixed to the base part 13, and the power supply part 11 and the connection terminal 12 (base part 13) may be electrically connected by using the plurality of spring members 16*a* to 16*c*. The plurality of spring members 16*a* to 16*c* are spaced apart from each other, and the slits (25) extend in the first direction. By connecting the power supply part 11 and the connection terminal 12 (base part 13) using the plurality of spring members 16*a* to 16*c* in this manner, the amount of electrical current flowing between the power supply part 11 and the connection terminal 12 (base part 13) can be increased. In the configuration shown in FIG. 17, each of the spring members 16*a* to 16*c* may be provided with a weir part or a wall part (not shown) for reducing the rotation about the fixing part.

Figure 18:
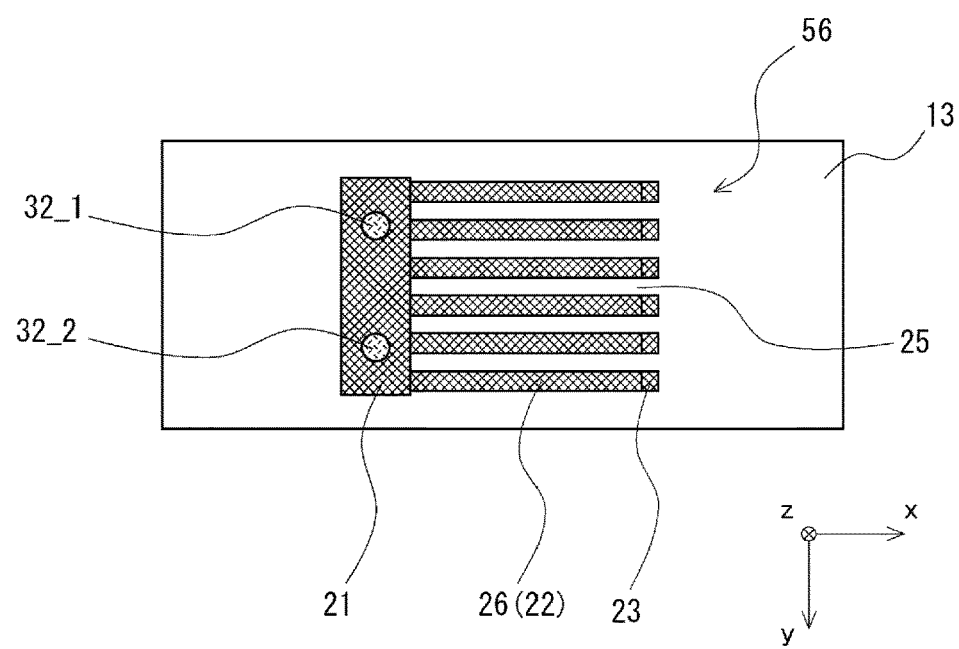
FIG. 18 is a plan view for explaining another example of the configuration of the spring member.

In this embodiment, as shown in FIG. 18, by increasing the number of slits 25 provided in a spring member 56 and increasing the number of branch parts 26 provided in one spring member 56, the amount of electrical current flowing between the power supply part 11 and the connection terminal 12 (base part 13) may be increased. In the case shown in FIG. 18, since the number of branch parts 26 is increased, the length of the spring member 56 in the y-axis direction is increased. Thus, in this case, it is preferable to provide through holes in a plurality of parts of the fixing part 21 to fix the spring member 56 to the base part 13 (in FIG. 18, the fixed positions are shown by enlarged diameter parts 32_1 and 32_2). In the configuration shown in FIG. 18, wall parts not shown (extending in the x-axis direction) may be provided at both ends of the contact parts 23 (aligned in the y-axis direction).

Further, in this embodiment, as shown in FIGS. 19A to 19D, a plurality of spring members 66*a* to 66*d* may be fixed to the base part 13, and the power supply part 11 and the connection terminal 12 (base part 13) may be electrically connected by using the plurality of spring members 66*a* to 66*d*. FIGS. 19A to 19D differ from FIG. 17 in that the directions in which the slits of at least two spring members from among the plurality of spring members extend are different from each other in FIGS. 19A to 19D. The direction in which the slit extends corresponds to the direction in which the slit (25) extends and is opened starting from the fixing part (21). The number of spring members are not limited to an even number and instead may be an odd number, and the slits of the respective spring members may be disposed in different directions in the electrical connection structure including three or more spring members.

Figure 19A:
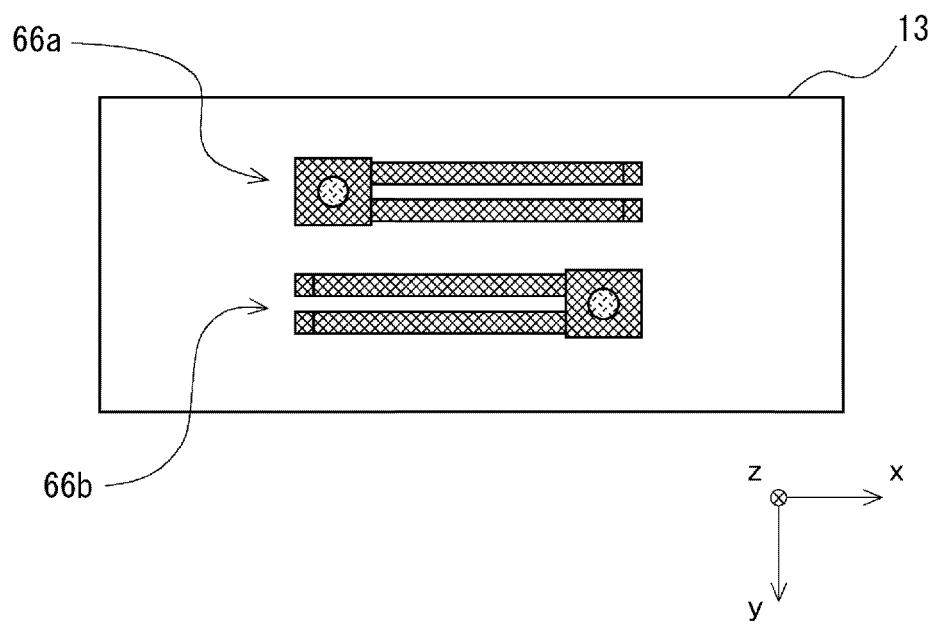
FIG. 19A is a plan view for explaining another example of the configuration of the spring member.
Figure 19B:
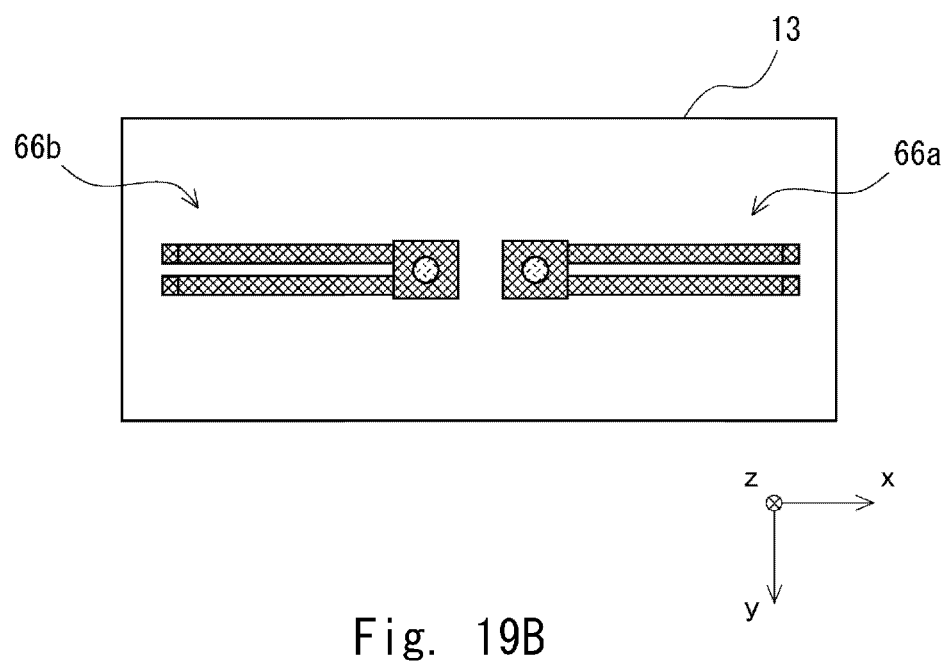
FIG. 19B is a plan view for explaining another example of the configuration of the spring member.

In FIG. 19A, the direction in which the slit (25) of the spring member 66*a* extends is the positive side in the x-axis direction, while the direction in which the slit (25) of the spring member 66*b* extends is the negative side in the x-axis direction. That is, the slits (25) of the spring members 66*a* and 66*b* extend in directions opposite to each other on one straight line (x-axis direction). Further, the spring members 66*a* and 66*b* are disposed so as to be adjacent to each other in the y-axis direction. FIG. 19B shows an arrangement in which the spring members 66*a* and 66*b* are disposed in such a way that their fixing parts (21) are adjacent to each other in the x-axis direction.

Figure 19C:
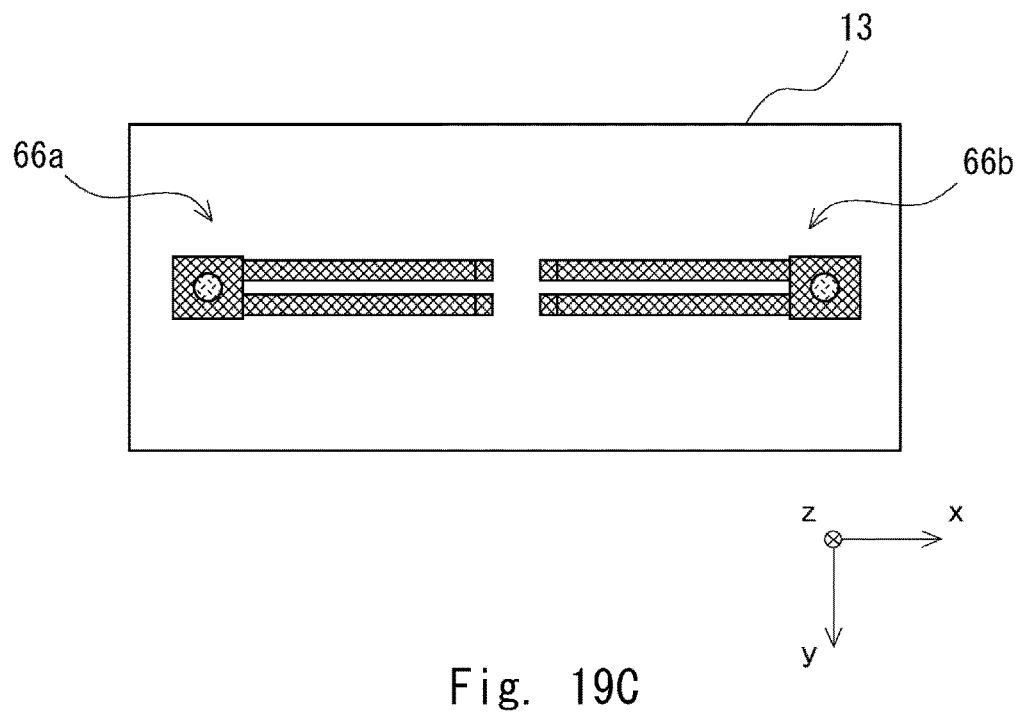
FIG. 19C is a plan view for explaining another example of the configuration of the spring member.

FIG. 19C shows an arrangement in which the spring members 66*a* and 66*b* are disposed in such a way that the opening parts of the slits (25) are adjacent to each other in the x-axis direction. In other words, the spring members 66*a* and 66*b* are disposed in such a way that their fixing parts (21) are disposed to be farthest apart in the x-axis direction.

Figure 19D:
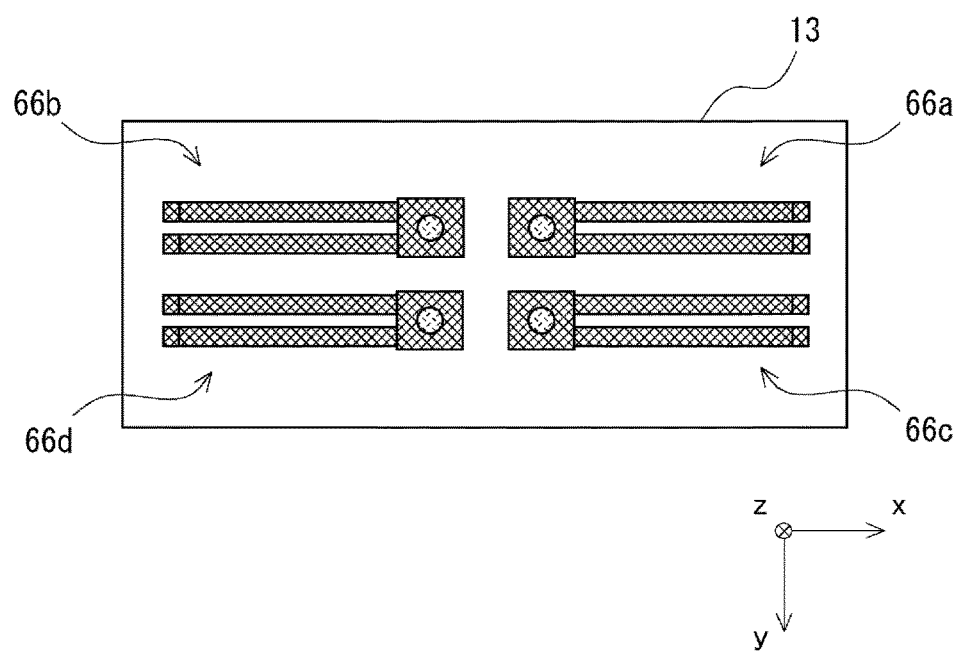
FIG. 19D is a plan view for explaining another example of the configuration of the spring member.

FIG. 19D shows an arrangement of four spring members including a spring member 66*a*, a spring member 66*b*, a spring member 66*c*, and a spring member 66*d*. The spring member 66*a* and the spring member 66*b* are disposed in the same way as those in FIG. 19B, and the spring member 66*c* and the spring member 66*d* are disposed in the same way as the spring member 66*a* and the spring member 66*b* in FIG. 19B, respectively. Further, in FIG. 19D, the spring member 66*a* and the spring member 66*c* are disposed adjacent to each other in the y-axis direction, and the spring member 66*b* and the spring member 66*d* are disposed adjacent to each other in the y-axis direction.

Next, another configuration example of the electrical connection structure according to this embodiment will be described.

Figure 20:
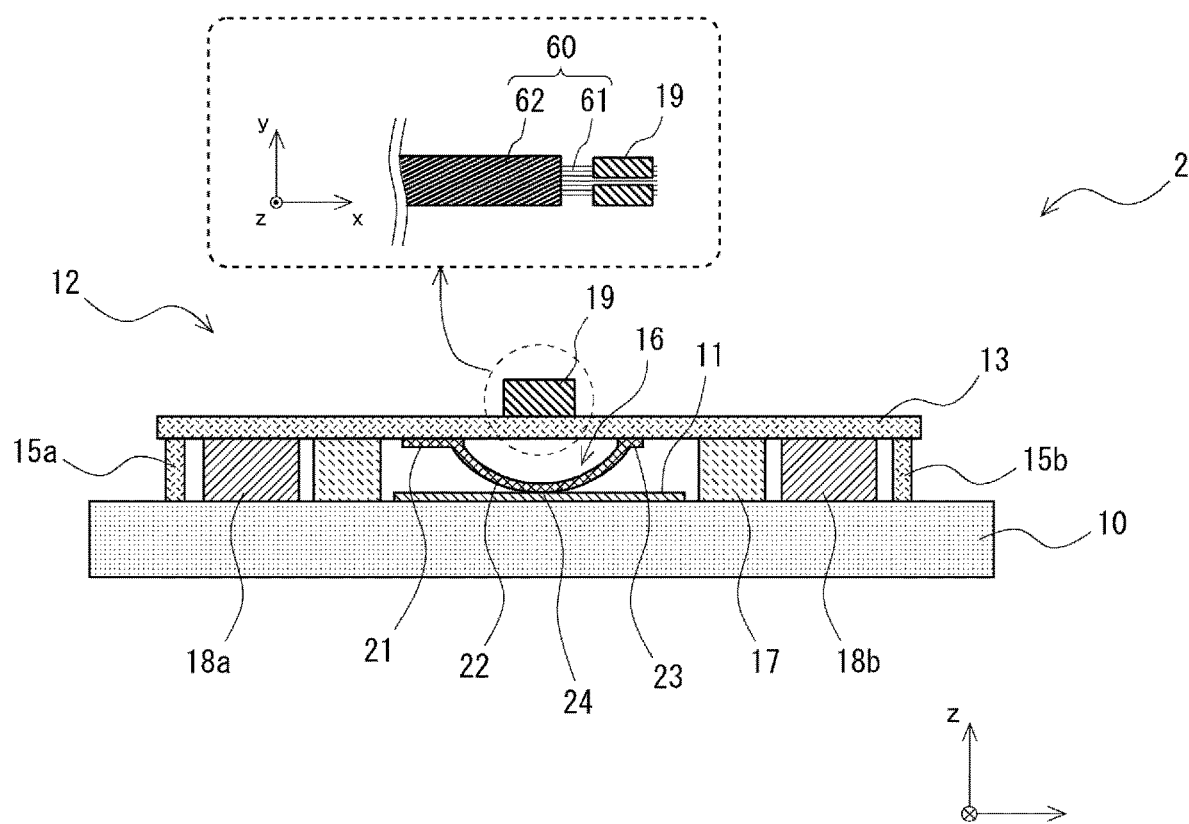
FIG. 20 is a cross-sectional view for explaining another electrical connection structure according to the embodiment.

FIG. 20 is a diagram for explaining another configuration example of the electrical connection structure according to this embodiment. In an electrical connection structure 2 shown in FIG. 20, the same parts as those of the electrical connection structure 1 shown in FIG. 1 are denoted by the same reference signs as those of the electrical connection structure 1 shown in FIG. 1, and the description of such parts will be omitted.

The electrical connection structure 2 shown in FIG. 20 is the same as the electrical connection structure 1 except that the male terminal part 14 is changed to a caulking terminal part 19. FIG. 20 also shows an enlarged view of a part surrounded by a broken line. The caulking terminal part 19 is an example in which a part where a conductor part 61 is exposed is caulked and fixed in the electric wire 60, which is composed of the conductor part 61 covered with a covering part 62. The caulking terminal part 19 may be fixed not only by mechanically fixing and connecting the electrical connection structure 2 to the electric wire 60 and instead may be fixed by soldering or by a conductive adhesive.

Figure 21:
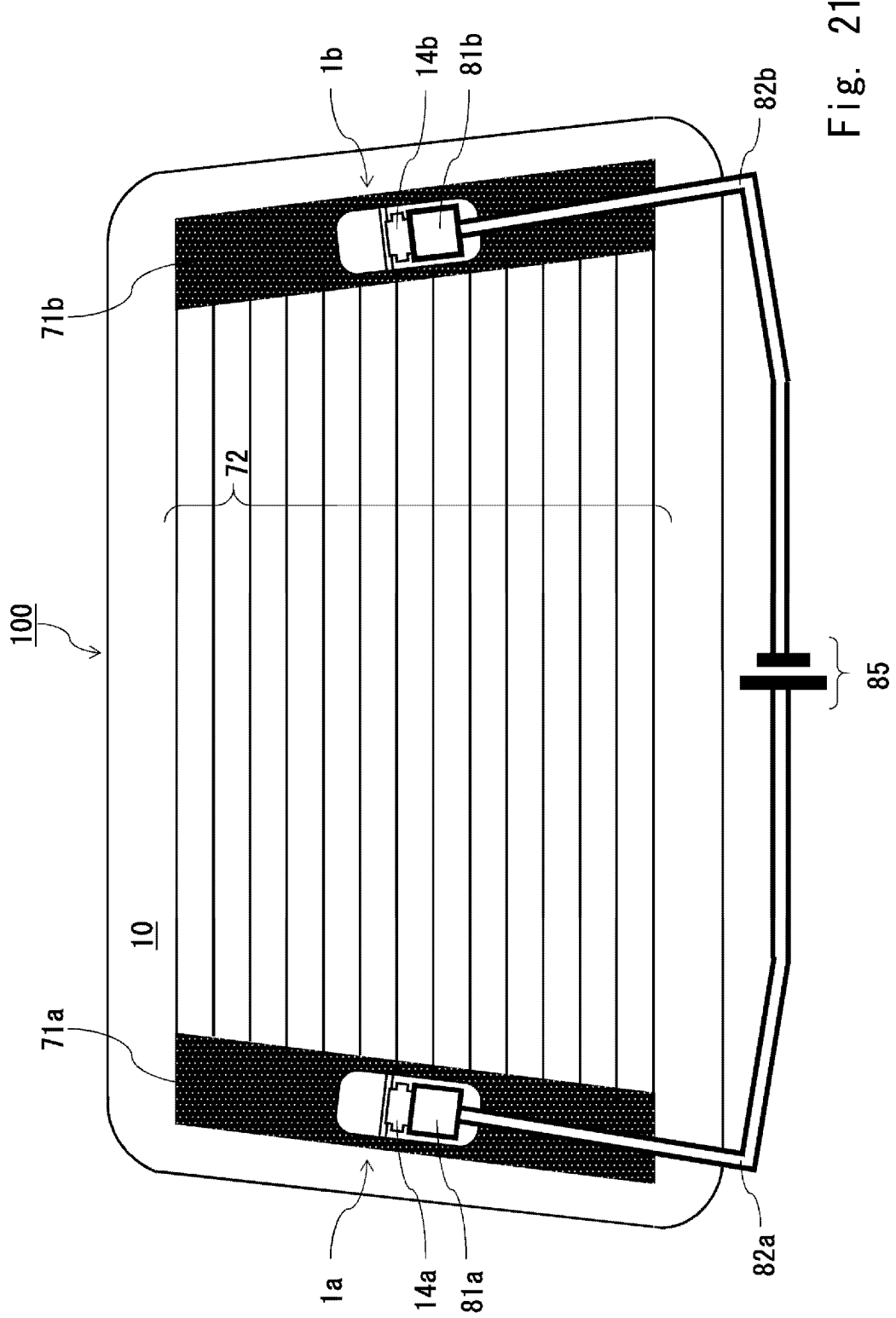
FIG. 21 shows a window glass for a vehicle using the electrical connection structure according to the embodiment.

FIG. 21 is a diagram showing an example in which the electrical connection structure according to this embodiment is mounted on a window glass for a vehicle. FIG. 21 shows an example of a window glass for a vehicle 100 in which the glass plate 10 is viewed in a plan view. The window glass for a vehicle 100 is used, for example, as a rear glass of a vehicle, and includes bus bars 71a and 71b and a plurality of electric heating wires 72. The bus bars 71a and 71b are arranged on the right and left sides of the glass plate 10 and extend vertically. The plurality of electric heating wires 72 extend to the right and left to connect the bus bar 71a to the bus bar 71b. The bus bars 71a and 71b and the plurality of heating wires 72 are conductors printed on the main surface of the glass plate 10.

The window glass for a vehicle 100 includes electrical connection structures 1a and 1b, and spring members of the electrical connection structures 1a and 1b are disposed to connect to the bus bars 71a and 71b, respectively. The electrical connection structure 1a includes a male terminal part 14a, and the electrical connection structure 1b includes a male terminal part 14b. Further, a conductive cable 82a is connected to the male terminal part 14a with a connector 81a interposed therebetween. Thus, the male terminal part 14a is electrically connected to the positive side (terminal) of a power source 85. A conductive cable 82b is connected to the male terminal part 14b with a connector 81b interposed therebetween. Thus, the male terminal part 14b is electrically connected to the negative side (terminal) of the power source 85. Note that a configuration including the window glass for a vehicle 100, the conductive cables 82a and 82b, and the power source 85 is also referred to as a "window glass apparatus for a vehicle".

As described above, the window glass apparatus for a vehicle using the electrical connection structures 1a and 1b according to this embodiment has a function of preventing fogging of the glass plate 10 by applying a DC voltage from the power source 85 to cause a direct electrical current to flow from the bus bar 71a to the bus bar 71b so as to heat the heating wire 72.

From the disclosure thus described, it will be obvious that the embodiments of the disclosure may be varied in many ways. Such fluctuations are not to be regarded as a departure from the spirit and scope of the disclosure, and all such modifications as would be obvious to one skilled in the art are intended for inclusion within the scope of the following claims.

What is claimed is:

1. An electrical connection structure comprising:
  a glass plate;
  a power supply part formed on the glass plate;
  a connection terminal including a base part facing the glass plate; and
  a spring member disposed between the power supply part and the base part and configured to electrically connect the power supply part to the base part, wherein
  the spring member comprises:
    a fixing part fixed to the base part;
    a curved part extending in a first direction parallel to a main surface of the base part from the fixing part and curved in such a way that a central part of the curved part protrudes toward the glass plate; and
    a first contact part and a second contact part disposed at end parts of the curved part on the first direction side, wherein
    the curved part includes a first branch part and a second branch part branched by a slit extending in the first direction,
    the first contact part and the second contact part are disposed at end parts of the first branch part and the second part, respectively, on the first direction side,
    the first contact part and the second contact part are separated by the slit, so that
    the first contact part and the second contact part are in contact with the base part independently of each other, and
    the curved part is in contact with the power supply part at a part protruding toward the glass plate.

2. The electrical connection structure according to claim 1, wherein
  the slit extends in the first direction starting from a position between an end part of the fixing part on the first direction side and the part of the curved part in contact with the power supply part, and
  in the curved part,
    the first branch part is in contact with the power supply part at a third contact part protruding toward the glass plate, and
    the second branch part is in contact with the power supply part at a fourth contact part protruding toward the glass plate.

3. The electrical connection structure according to claim 1, wherein
  a through hole is formed in the fixing part of the spring member, and
  the fixing part is fixed to the base part by inserting a projection of the base part into the through hole.

4. The electrical connection structure according to claim 3, wherein
  the projection of the base part penetrates through the through hole, a leading end of the projection is greater than an inner diameter of the through hole on a surface of the fixing part on the glass plate side, and the fixing part is fixed to the base part.

5. The electrical connection structure according to claim 1, wherein
  one through hole is formed in the fixing part of the spring member, and
  the base part includes a weir part protruding from the base part toward the glass plate around the fixing part.

6. The electrical connection structure according to claim 5, wherein
  the fixing part has a polygonal shape in a plan view, and
  the weir part is provided at a position facing at least one side around the fixing part.

7. The electrical connection structure according to claim 6, wherein
  the weir parts are provided at positions facing respective two sides parallel to the first direction from among sides of the fixing part.

8. The electrical connection structure according to claim 6, wherein
the fixing part has a quadrangular shape in a plan view, and
the weir parts are provided at positions facing respective three sides from among sides of the fixing part of sides of the fixing part other than a side of the fixing part on the curved part side.

9. The electrical connection structure according to claim 5, wherein
a height of the weir part is greater than or equal to a height of the fixing part.

10. The electrical connection structure according to claim 1, wherein
two or more of the through holes are formed in the fixing part of the spring member.

11. The electrical connection structure according to claim 1, wherein
the base part includes a first wall part and a second wall part that protrude from the base part toward the glass plate around the first contact part and the second contact part, respectively,
the first wall part is formed to extend in the first direction on an opposite side of the slit of the first contact part, and
the second wall part is formed to extend in the first direction on an opposite side of the slit of the second contact part.

12. The electrical connection structure according to claim 1, wherein
an area where the base part is in contact with the fixing part is larger than a sum of an area where the base part is in contact with the first contact part and an area where the base part is in contact with the second contact part.

13. The electrical connection structure according to claim 1, wherein
each of the first contact part and the second contact part has a substantially quadrangular shape in a plan view, and
in each of the first contact part and the second contact part, a length of a side extending in a second direction substantially orthogonal to the first direction is greater than a side extending in the first direction.

14. The electrical connection structure according to claim 1, wherein
the spring member comprises:
a first non-contact part extending further in the first direction from the first contact part and not in contact with the base part; and
a second non-contact part extending further in the first direction from the second contact part and not in contact with the base part.

15. The electrical connection structure according to claim 1, further comprising an adhesive member for bonding the base part to the glass plate, wherein
the adhesive member includes a first adhesive member,
the first adhesive member is disposed to surround a periphery of the spring member in a plan view, and
the adhesive member maintains a height of the spring member in a direction of the protrusion between the glass plate and the base part.

16. The electrical connection structure according to claim 15, wherein
a space formed by the glass plate, the base part, and the first adhesive member forms a closed space.

17. The electrical connection structure according to claim 15, wherein
the adhesive member includes a second adhesive member, and
the second adhesive member bonds the base part to the glass plate.

18. The electrical connection structure according to claim 1, wherein
the base part includes a protrusion protruding from the main surface of the base part toward the glass plate, and
the spring member disposed between the power supply part and the base part is prevented from being excessively deformed by the protrusion contacting with the glass plate.

19. The electrical connection structure according to claim 1, wherein
a plurality of the spring members are spaced apart from each other.

20. The electrical connection structure according to claim 19, wherein
all of the slits of the plurality of spring members extend in the first direction.

* * * * *